United States Patent
Qian et al.

(10) Patent No.: US 12,222,622 B2
(45) Date of Patent: *Feb. 11, 2025

(54) ARRAY SUBSTRATE AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Xueqiang Qian, Beijing (CN); Dongchuan Chen, Beijing (CN); Yanfeng Li, Beijing (CN); Yu Xing, Beijing (CN); Kaixuan Wang, Beijing (CN); Bingyang Liu, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/467,337

(22) Filed: Sep. 14, 2023

(65) Prior Publication Data

US 2024/0004247 A1 Jan. 4, 2024

Related U.S. Application Data

(63) Continuation of application No. 17/789,551, filed as application No. PCT/CN2021/099317 on Jun. 10, 2021, now Pat. No. 11,796,876.

(30) Foreign Application Priority Data

Jul. 31, 2020 (CN) .......................... 202010763238.5

(51) Int. Cl.
G02F 1/1362 (2006.01)
G02F 1/1335 (2006.01)
G02F 1/1368 (2006.01)

(52) U.S. Cl.
CPC .. *G02F 1/136286* (2013.01); *G02F 1/133512* (2013.01); *G02F 1/1362* (2013.01); (Continued)

(58) Field of Classification Search
None
See application file for complete search history.

(56) References Cited

U.S. PATENT DOCUMENTS 8,605,238 B2 * 12/2013 Matsui .............. G02F 1/133514
349/106
9,620,533 B2 4/2017 Kim et al.
(Continued)

FOREIGN PATENT DOCUMENTS

CN 101825815 A 9/2010
CN 106873277 A 6/2017
(Continued)

OTHER PUBLICATIONS

Chinese First Office Action (w/ English translation) for corresponding Chinese Application No. 202010763238.5, dated Jul. 14, 2022, 23 pages.

(Continued)

*Primary Examiner* — Dung T Nguyen
(74) *Attorney, Agent, or Firm* — Dority & Manning, P.A.

(57) ABSTRACT

An array substrate has sub-pixel regions arranged in an array, and the sub-pixel regions include white sub-pixel regions and primary color sub-pixel regions. The array substrate includes a first substrate and a plurality of sub-pixels disposed on the first substrate. The sub-pixels include white sub-pixels and primary color sub-pixels. In a column (Continued)

direction, a side of each white sub-pixel is adjacent to at least one primary color sub-pixel. Each sub-pixel has light-shielding patterns. In the column direction, in a plurality of light-shielding patterns of a primary color sub-pixel adjacent to the white sub-pixel, a part of the light-shielding patterns are disposed in a white sub-pixel region where the white sub-pixel is located, and another part of the light-shielding patterns are disposed in a primary color sub-pixel region corresponding to the primary color sub-pixel.

18 Claims, 14 Drawing Sheets

(52) U.S. Cl.
CPC .. *G02F 1/136209* (2013.01); *G02F 1/136222* (2021.01); *G02F 1/1368* (2013.01)

(56) References Cited

U.S. PATENT DOCUMENTS

| | | | |
|---|---|---|---|
| 11,796,876 B2* | 10/2023 | Qian | G02F 1/136209 |
| 2005/0073487 A1 | 4/2005 | Matsumoto | |
| 2006/0262262 A1 | 11/2006 | Kim et al. | |
| 2008/0218461 A1 | 9/2008 | Sugita et al. | |
| 2009/0309821 A1 | 12/2009 | Tanno | |
| 2010/0283714 A1 | 11/2010 | Cho et al. | |
| 2015/0109568 A1 | 4/2015 | Kozuka et al. | |
| 2015/0309346 A1 | 10/2015 | Oh et al. | |
| 2016/0027841 A1 | 1/2016 | Xu et al. | |
| 2016/0178981 A1 | 6/2016 | Lee et al. | |
| 2017/0131608 A1 | 5/2017 | Jin | |
| 2017/0299926 A1 | 10/2017 | Takeda et al. | |
| 2018/0031887 A1 | 2/2018 | Cao et al. | |
| 2018/0088423 A1 | 3/2018 | Hoshina | |
| 2018/0301468 A1 | 10/2018 | Wang | |
| 2019/0018279 A1 | 1/2019 | Wang et al. | |
| 2019/0086591 A1 | 3/2019 | Wei et al. | |
| 2019/0204671 A1 | 7/2019 | Lee et al. | |
| 2019/0243495 A1 | 8/2019 | Guo et al. | |
| 2019/0265564 A1 | 8/2019 | Li et al. | |
| 2020/0019029 A1 | 1/2020 | Park et al. | |
| 2021/0074774 A1 | 3/2021 | Su et al. | |
| 2021/0165287 A1 | 6/2021 | Jiang et al. | |

FOREIGN PATENT DOCUMENTS

| | | |
|---|---|---|
| CN | 108319055 A | 7/2018 |
| JP | H07311378 A | 11/1995 |
| JP | H0943425 A | 2/1997 |
| JP | H10104605 A | 4/1998 |
| JP | H10206862 A | 8/1998 |

OTHER PUBLICATIONS

Chinese Second Office Action (w/ English translation) for corresponding Chinese Application No. 202010763238.5, dated Feb. 11, 2023, 9 pages.
Chinese Third Office Action (w/ English translation) for corresponding Chinese Application No. 202010763238.5, dated Jun. 26, 2023, 16 pages.
Non-Final Office Action received for corresponding U.S. Appl. No. 17/789,551, dated Jan. 6, 2023, 10 pages.
Notice of Allowance received for corresponding U.S. Appl. No. 17/789,551, dated Jul. 12, 2023, 8 pages.
PCT International Search Report and Written Opinion (w/ English translation) for corresponding PCT Application No. PCT/CN2021/099317, mailed Sep. 15, 2021, 18 pages.

* cited by examiner

| 100 | | | P(S) | P1(S1) | P1(S1) | P1(S1) | |
|---|---|---|---|---|---|---|---|
| R1 (R2) | G1 (G2) | B1 (B2) | W1 (W2) | R1 (R2) | G1 (G2) | B1 (B2) | W1 (W2) | R1 (R2) |
| W1 (W2) | R1 (R2) | G1 (G2) | B1 (B2) | W1 (W2) | R1 (R2) | G1 (G2) | B1 (B2) | W1 (W2) |
| B1 (B2) | W1 (W2) | R1 (R2) | G1 (G2) | B1 (B2) | W1 (W2) | R1 (R2) | G1 (G2) | B1 (B2) |
| G1 (G2) | B1 (B2) | W1 (W2) | R1 (R2) | G1 (G2) | B1 (B2) | W1 (W2) | R1 (R2) | G1 (G2) |
| R1 (R2) | G1 (G2) | B1 (B2) | W1 (W2) | R1 (R2) | G1 (G2) | B1 (B2) | W1 (W2) | R1 (R2) |
| W1 (W2) | R1 (R2) | G1 (G2) | B1 (B2) | W1 (W2) | R1 (R2) | G1 (G2) | B1 (B2) | W1 (W2) |
| B1 (B2) | W1 (W2) | R1 (R2) | G1 (G2) | B1 (B2) | W1 (W2) | R1 (R2) | G1 (G2) | B1 (B2) |

FIG. 3

ARRAY SUBSTRATE AND DISPLAY APPARATUS

CROSS-REFERENCE TO RELATED APPLICATIONS

This application is a continuation of U.S. patent application Ser. No. 17/789,551, filed on Jun. 28, 2022, which claims priority to International Patent Application No. PCT/CN2021/099317, filed on Jun. 10, 2021, which claims priority to Chinese Patent Application No. 202010763238.5, filed on Jul. 31, 2020, which are incorporated herein by reference in their entirety.

TECHNICAL FIELD

The present disclosure relates to the field of display technologies, and in particular, to an array substrate and a display apparatus.

BACKGROUND

Liquid crystal display (LCD) apparatuses are widely used due to their advantages such as low power consumption, miniaturization, lightness and thinness.

SUMMARY

In an aspect, an array substrate is provided. The array substrate has a plurality of sub-pixel regions arranged in an array, and the plurality of sub-pixel regions include a plurality of white sub-pixel regions and a plurality of primary color sub-pixel regions. The array substrate includes a first substrate and a plurality of sub-pixels disposed on a side of the first substrate. The plurality of sub-pixels include a plurality of white sub-pixels and a plurality of primary color sub-pixels, and in a column direction, a side of each white sub-pixel is adjacent to at least one primary color sub-pixel of the plurality of primary color sub-pixels. Of the plurality of sub-pixels, each sub-pixel has a plurality of light-shielding patterns. In the column direction, in a plurality of light-shielding patterns of a primary color sub-pixel of the at least one primary color sub-pixel adjacent to the white sub-pixel, a part of the light-shielding patterns are disposed in a white sub-pixel region where the white sub-pixel is located, and another part of the light-shielding patterns are disposed in a primary color sub-pixel region corresponding to the primary color sub-pixel.

The plurality of primary color sub-pixels include a plurality of red sub-pixels, a plurality of green sub-pixels, and a plurality of blue sub-pixels; in the column direction, the white sub-pixel is adjacent to a green sub-pixel; and in a row direction, a red sub-pixel and a blue sub-pixel are located on two opposite sides of the green sub-pixel, and the row direction intersects the column direction.

In some embodiments, the array substrate further includes a plurality of data lines disposed on the side of the first substrate and a plurality of gate lines disposed on the side of the first substrate. The plurality of light-shielding patterns of the sub-pixel include: a portion, passing through the sub-pixel, of a data line of the plurality of data lines substantially extending in the column direction, a portion, passing through the sub-pixel, of a gate line of the plurality of gate lines substantially extending in the row direction, and a thin film transistor electrically connected to the data line and the gate line. In the column direction, in the plurality of light-shielding patterns of the primary color sub-pixel adjacent to the white sub-pixel, the part of the light-shielding patterns disposed in the white sub-pixel region where the white sub-pixel is located include: a portion, passing through the primary color sub-pixel, of a gate line of the plurality of gate lines, and/or a thin film transistor.

In some embodiments, a ratio of areas of openings of the red sub-pixels, the green sub-pixels, the blue sub-pixels and the white sub-pixels is in a range of (0.8 to 1.2):(0.8 to 1.2):(0.8 to 1.2):(0.4 to 0.8).

In some embodiments, the ratio of the areas of the openings of the red sub-pixels, the green sub-pixels, the blue sub-pixels and the white sub-pixels is $1:1:1:\frac{1}{2}$, $1:1:1:\frac{27}{50}$, $1:1:1:\frac{11}{20}$ or $1:1:1:\frac{2}{3}$.

In some embodiments, in the row direction, a dimension of an opening of the red sub-pixel is substantially equal to a dimension of an opening of the blue sub-pixel, the dimension of the opening of the red sub-pixel is greater than a dimension of an opening of the green sub-pixel, and the dimension of the opening of the green sub-pixel is greater than a dimension of an opening of the white sub-pixel. In the column direction, the dimension of the opening of the green sub-pixel is greater than the dimension of the opening of the red sub-pixel, the dimension of the opening of the red sub-pixel is substantially equal to the dimension of the opening of the blue sub-pixel, and the dimension of the opening of the red sub-pixel is greater than the dimension of the opening of the white sub-pixel.

In some embodiments, in the row direction, a ratio of the dimension of the opening of the red sub-pixel, the dimension of the opening of the green sub-pixel, the dimension of the opening of the blue sub-pixel and the dimension of the opening of the white sub-pixel is in a range of (1.4 to 1.5):(1.2 to 1.4):(1.4 to 1.5):1. In the column direction, a ratio of the dimension of the opening of the red sub-pixel, the dimension of the opening of the green sub-pixel, the dimension of the opening of the blue sub-pixel and the dimension of the opening of the white sub-pixel is in a range of (1.2 to 1.3):(1.3 to 1.8):(1.2 to 1.3):1.

In some embodiments, in the row direction, the ratio of the dimension of the opening of the red sub-pixel, the dimension of the opening of the green sub-pixel, the dimension of the opening of the blue sub-pixel and the dimension of the opening of the white sub-pixel is 1.4:1.2:1.4:1, 1.42:1.23:1.45:1, or 1.5:1.4:1.5:1.

In some embodiments, in the column direction, the ratio of the dimension of the opening of the red sub-pixel, the dimension of the opening of the green sub-pixel, the dimension of the opening of the blue sub-pixel and the opening dimension of the white sub-pixel is 1.2:1.3:1.2:1, 1.25:1.4:1.26:1, or 1.3:1.8:1.3:1.

In the column direction, the array substrate further includes a plurality of common electrode lines extending in the column direction. The sub-pixel further includes a common electrode disposed on a side of the plurality of light-shielding patterns away from the first substrate. The common electrode is electrically connected to at least one common electrode line of the plurality of common electrode lines.

In some embodiments, the array substrate further includes a plurality of data lines disposed on the side of the first substrate. The plurality of light-shielding patterns include a portion, passing through the sub-pixel, of a data line of the plurality of data lines; and the plurality of common electrode lines and the data line are disposed in a same layer.

In some embodiments, the array substrate further includes a plurality of data lines disposed on the side of the first substrate. In a direction parallel to a plane where the first substrate is located and perpendicular to the column direction, a ratio of a dimension of a common electrode line of the plurality of common electrode lines and a dimension of a data line of the plurality of data lines is in a range of 1:2 to 1:1, inclusive.

In some embodiments, the sub-pixel further includes a pixel electrode disposed on a side of the common electrode away from the first substrate. The pixel electrode has at least one slit; and an extending direction of the at least one slit is parallel to or at an acute angle to the column direction.

In some embodiments, the pixel electrode includes strip-shaped sub-electrodes located on two sides of the slit. In the row direction, a range of a ratio between a dimension of a slit and a dimension of a stripe-shaped sub-electrode of a pixel electrode in the white sub-pixel is substantially same as a range of a ratio between a dimension of a slit and a dimension of a stripe-shaped sub-electrode of a pixel electrode in the green sub-pixel.

In some embodiments, in the row direction, the ratio between the dimension of the slit and the dimension of the stripe-shaped sub-electrode of the pixel electrode in the white sub-pixel is in a range of (2.4 to 2.8):(2.0 to 2.7).

In some embodiments, in the row direction, a range of a ratio between a dimension of a slit and a dimension of a stripe-shaped sub-electrode of a pixel electrode in the red sub-pixel is substantially same as a range of a ratio between a dimension of a slit and a dimension of a stripe-shaped sub-electrode of a pixel electrode in the blue sub-pixel.

In some embodiments, in the row direction, the ratio between the dimension of the slit and the dimension of the stripe-shaped sub-electrode of the pixel electrode in the red sub-pixel is in a range of (2.2 to 2.8):(2.0 to 2.5).

In another aspect, a display apparatus is provided. The display apparatus includes: the array substrate according to any one of the above embodiments, a counter substrate disposed opposite to the array substrate, and a liquid crystal layer disposed between the array substrate and the counter substrate.

In some embodiments, the counter substrate includes: a second substrate, a black matrix disposed on a side of the second substrate proximate to the array substrate, the black matrix having a plurality of openings, and the plurality of openings including a plurality of first openings respectively opposite to the plurality of white sub-pixels in the array substrate and a plurality of second openings respectively opposite to the plurality of primary color sub-pixels in the array substrate, a color filter layer, the color filter layer including a plurality of color filter portions each disposed in a respective one of the plurality of second openings, and a planarization layer disposed on a side of the color filter layer away from the second substrate, a portion of the planarization layer being located in the plurality of first openings.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person having ordinary skill in the art may obtain other drawings according to these drawings. In addition, the accompanying drawings to be described below may be regarded as schematic diagrams, but are not limitations on actual sizes of products and actual processes of methods to which the embodiments of the present disclosure relate.

FIG. 3 is a structural diagram of yet another array substrate, in accordance with some embodiments of the present disclosure;

DETAILED DESCRIPTION

Figure 1:
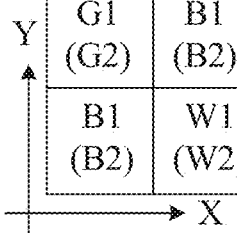
FIG. 1 is a structural diagram of an array substrate, in accordance with some embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person having ordinary skill in the art based on embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description, the term such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, features defined with "first" and "second" may explicitly or implicitly include one or more of the features. In the description of the embodiments of the present disclosure, the term "a/the plurality of" means two or more unless otherwise specified.

In the description of some embodiments, terms such as "connected" and their extensions may be used. For example, the term "connected" may be used in the description of some embodiments to indicate that two or more components are in direct physical or electrical contact with each other. The embodiments disclosed herein are not necessarily limited to the contents herein.

As used herein, depending on the context, the term "if" is optionally construed as "when" or "in a case where" or "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of "applicable to" or "configured to" herein means an open and inclusive expression, which does not exclude devices that are applicable to or configured to perform additional tasks or steps.

In addition, the use of the phrase "based on" is meant to be open and inclusive, since a process, a step, a calculation or other action that is "based on" one or more of the stated conditions or values may, in practice, be based on additional conditions or values exceeding those stated.

As used herein, the term "approximately" or "substantially" includes a stated value and an average value within an acceptable deviation range of a specific value. The acceptable deviation range is determined by a person of ordinary skill in the art in view of the measurement in question and the error associated with the measurement of a particular quantity (i.e., limitations of the measurement system).

Exemplary embodiments are described herein with reference to sectional views and/or plan views as idealized exemplary drawings. In the accompanying drawings, thickness of layers and regions are enlarged for clarity. Therefore, variations in shapes with respect to the accompanying drawings due to, for example, manufacturing technologies and/or tolerances may be envisaged. Therefore, the exemplary embodiments should not be construed as being limited to the shapes of the regions shown herein, but including deviations due to, for example, manufacturing. Therefore, the exemplary embodiments should not be construed as being limited to the shapes of the regions shown herein, but comprising shape deviations due to, for example, manufacturing. Thus, the regions shown in the accompanying drawings are schematic in nature, and their shapes are not intended to show actual shapes of regions in a device, and are not intended to limit the scope of the exemplary embodiments.

A liquid crystal display (LCD) usually has a plurality of pixels (e.g., each pixel includes a red sub-pixel, a green sub-pixel and a blue sub-pixel), and the plurality of pixels may cooperate with one another to enable the LCD to display images.

Each of the above-mentioned pixels further includes a white sub-pixel, so that the white sub-pixel may be used to improve a display brightness of the LCD.

However, since an area occupied by each pixel in the LCD is basically constant, and a ratio of an area occupied by the white sub-pixel to a total area occupied by the red sub-pixel, the green sub-pixel and the blue sub-pixel in each pixel is high, it is easy to make a ratio of brightness of white light displayed by the white sub-pixel to brightness of white light displayed by the red sub-pixel, the green sub-pixel and the blue sub-pixel together high, which exceeds a brightness specification of white light of a product, thereby easily causing the waste of the white light. Moreover, a proportion of the total area occupied by the red sub-pixel, the green sub-pixel and the blue sub-pixel is small, so that a brightness of a single color image, such as red, green, or blue is easily reduced, and in turn, image quality of the single color image is reduced.

Figure 2:
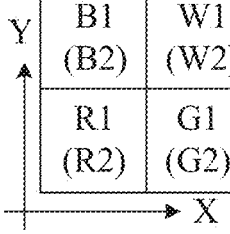
FIG. 2 is a structural diagram of another array substrate, in accordance with some embodiments of the present disclosure.

Based on this, some embodiments of the present disclosure provide an array substrate 100. As shown in FIGS. 1 to 3, the array substrate 100 has a plurality of sub-pixel regions P arranged in an array, and the plurality of sub-pixel regions P include a plurality of white sub-pixel regions W1 and a plurality of primary color sub-pixel regions P1.

Colors corresponding to the plurality of primary color sub-pixel regions P1 may include a first color, a second color and a third color. The first color, the second color and the third color include various types, which may be selectively set according to actual needs.

In some embodiments, as shown in FIGS. 1 to 3, the first color includes red, the second color includes green, and the third color includes blue. That is, the plurality of primary color sub-pixel regions P1 may include a plurality of red sub-pixel regions R1, a plurality of green sub-pixel regions G1, and a plurality of blue sub-pixel regions B1.

In some other examples, the first color includes magenta, the second color includes yellow, and the third color includes cyan. That is, the plurality of primary color sub-pixel regions P1 may include a plurality of magenta sub-pixel regions, a plurality of yellow sub-pixel regions, and a plurality of cyan sub-pixel regions.

The plurality of sub-pixel regions P are arranged in an array, that is, the plurality of white sub-pixel regions W1 and the plurality of primary color sub-pixel regions P1 are arranged in the array. An arrangement between the plurality of white sub-pixel regions W1 and the plurality of primary color sub-pixel regions P1 includes various types, which may be selectively set according to actual needs.

Herein, the arrangement between the plurality of white sub-pixel regions W1 and the plurality of primary color sub-pixel regions P1 will be schematically illustrated by considering an example where the plurality of primary color sub-pixel regions P1 include the plurality of red sub-pixel regions R1, the plurality of green sub-pixel regions G1 and the plurality of blue sub-pixel regions B1.

In some examples, as shown in FIG. 1, in a row direction X, in multiple sub-pixel regions P in each row, a red sub-pixel region R1, a green sub-pixel region G1, a blue sub-pixel region B1 and a white sub-pixel region W1 are alternately arranged in sequence; in a column direction Y, in multiple sub-pixel regions P in each column, a red sub-pixel region R1, a green sub-pixel region G1, a blue sub-pixel region B1 and a white sub-pixel region W1 are alternately arranged in sequence.

In some other examples, as shown in FIG. 2, in the row direction X, in multiple sub-pixel regions P in each row, a red sub-pixel region R1, a green sub-pixel region G1, a blue sub-pixel region B1 and a white sub-pixel region W1 are alternately arranged in sequence; in the column direction Y, in multiple sub-pixel regions P in each column, a red sub-pixel region R1 and a blue sub-pixel region B1 are alternately arranged in sequence, alternatively, a green sub-pixel region G1 and a white sub-pixel region W1 are alternately arranged in sequence.

In still some other examples, as shown in FIG. 3, in the row direction X, in multiple sub-pixel regions P in each row, a red sub-pixel region R1, a green sub-pixel region G1, a blue sub-pixel region B1 and a white sub-pixel region W1 are alternately arranged in sequence; in the column direction Y, in multiple sub-pixel regions P in each column, a red sub-pixel region R1, a white sub-pixel region W1, a blue sub-pixel region B1 and a green sub-pixel region G1 are alternately arranged in sequence.

It will be noted that, in the row direction X, in the multiple sub-pixel regions P in each row, there is no limitation to the single arrangement in which the red sub-pixel region R1, the green sub-pixel region G1, the blue sub-pixel region B1, and the white sub-pixel region W1 are alternately arranged in sequence, and these sub-pixel regions may be arranged in other orders, for example, two or three of the red sub-pixel region R1, the green sub-pixel region G1, the blue sub-pixel region B1 and the white sub-pixel region W1 are alternately arranged in sequence. Accordingly, the arrangement between the plurality of white sub-pixel regions W1 and the plurality of primary color sub-pixel regions P1 is not limited to the three illustrated above.

In addition, in the column direction Y, dimensions of the plurality of sub-pixel regions P included in the array substrate 100 are equal or substantially equal. In borders of the multiple sub-pixel regions P in each row, connection lines between some of the borders located at a same side in the row direction X are straight lines or substantially straight lines.

In some examples, the row direction X intersects the column direction Y. An included angle between the row direction X and the column direction Y may be selectively set according to actual needs. For example, the row direction X and the column direction Y may be perpendicular to each other.

The "row" mentioned herein does not refer to a row direction on paper; the "column" mentioned herein does not refer to a column direction on paper. In some cases, embodiments involving "row direction" may be implemented in a case of "column direction", and vice versa. It is also within the scope of the claims to be protected by the present disclosure to rotate or mirror the solution of the present disclosure by 90°.

Figure 5:
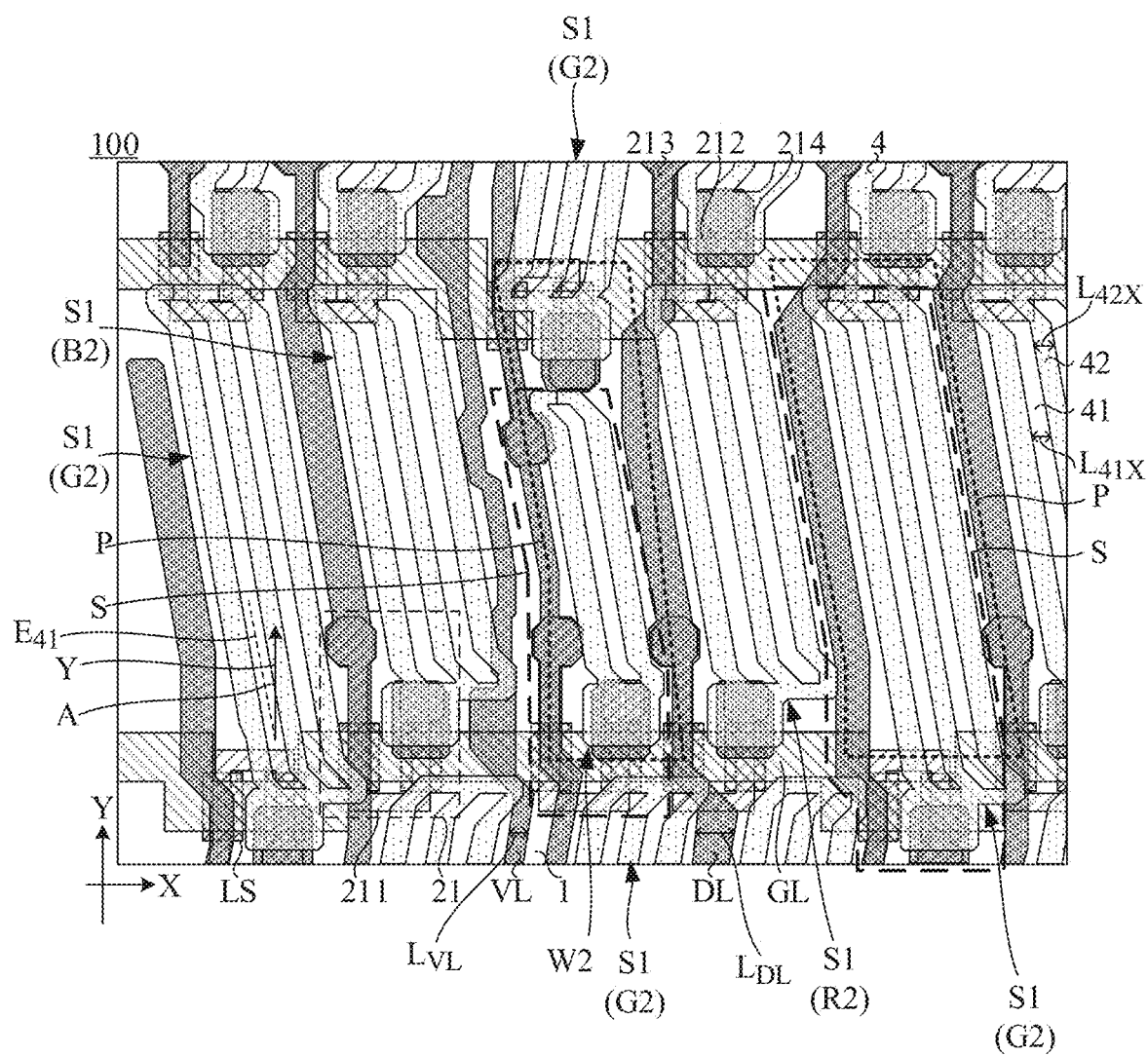
FIG. 5 is a structural diagram of yet another array substrate, in accordance with some embodiments of the present disclosure.
Figure 6:
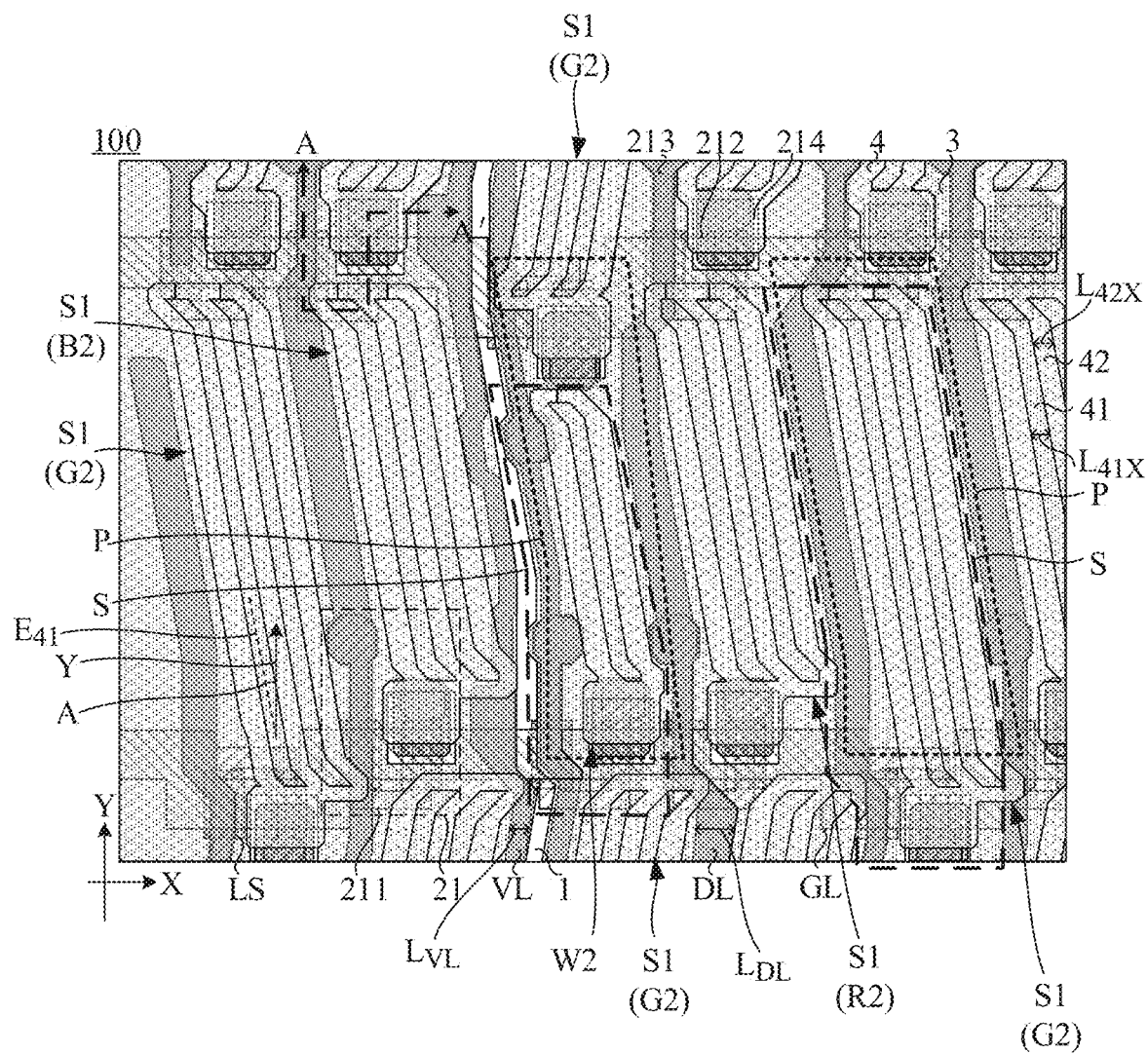
FIG. 6 is a structural diagram of yet another array substrate, in accordance with some embodiments of the present disclosure.
Figure 7:
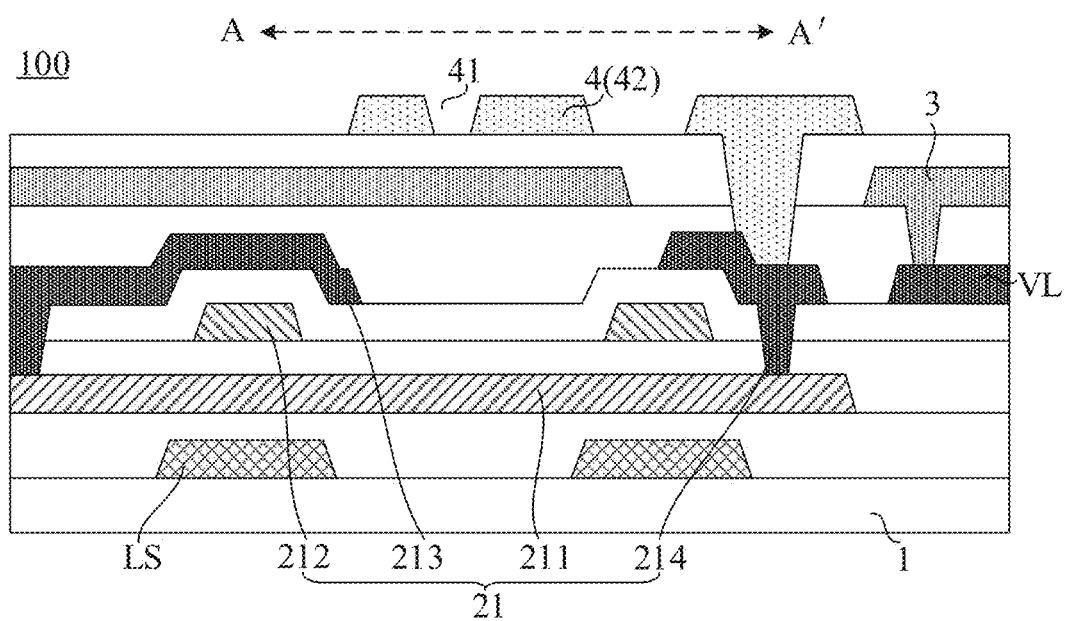
FIG. 7 is a sectional view of the array substrate in FIG. 6 taken along the A-A' direction.

In some embodiments, as shown in FIGS. 5 to 7, the array substrate 100 includes a first substrate 1.

The first substrate 1 may include various types, which may be selectively set according to actual needs.

For example, the first substrate 1 may be a blank base substrate. For another example, the first substrate 1 may include the blank base substrate and a functional film (e.g., a buffer layer) disposed on a side of the blank base substrate.

The blank base substrate may include various types, which may be selectively set according to actual needs. For example, the blank base substrate may be a polymethyl methacrylate (PMMA) base substrate or a glass base substrate.

In some embodiments, the array substrate 100 further includes a plurality of sub-pixels S disposed on a side of the first substrate 1. In a case where the first substrate 1 includes the blank base substrate and the functional film disposed on the side of the blank base substrate, the plurality of sub-pixels S may be disposed on a side of the functional film away from the blank base substrate.

In some examples, the plurality of sub-pixels S include a plurality of white sub-pixels W2 and a plurality of primary color sub-pixels S1.

Here, colors corresponding to the plurality of primary color sub-pixels S1 are the same as the colors corresponding to the plurality of primary color sub-pixel regions P1. That is, the plurality of primary color sub-pixels S1 may include a plurality of first color pixels S11, a plurality of second color sub-pixels S12 and a plurality of third color sub-pixels S13.

In a case where the plurality of primary color sub-pixel regions P1 include the plurality of red sub-pixel regions R1, the plurality of green sub-pixel regions G1 and the plurality of blue sub-pixel regions B1, the plurality of first color sub-pixels S11 may include a plurality of red sub-pixels R2, the plurality of second color sub-pixels S12 may include a plurality of green sub-pixels G2, and the plurality of third color sub-pixels S13 may include a plurality of blue sub-pixels B2. In a case where the plurality of primary color sub-pixel regions P1 include the plurality of magenta sub-pixel regions, the plurality of yellow sub-pixel regions, and the plurality of cyan sub-pixel regions, the plurality of first color sub-pixels S11 may include a plurality of magenta sub-pixels, the plurality of second color sub-pixels S12 may include a plurality of yellow sub-pixels, and the plurality of third color sub-pixels S13 may include a plurality of cyan sub-pixels.

It will be noted that arrangement positions of the plurality of white sub-pixels W2 correspond to arrangement positions of the plurality of white sub-pixel regions W1, and arrangement positions of the plurality of primary color sub-pixels S1 correspond to arrangement positions of the plurality of primary color sub-pixel regions P1. That is, an arrangement between the plurality of white sub-pixels W2 and the plurality of primary color sub-pixels S1 is the same as the arrangement between the plurality of white sub-pixel regions W1 and the plurality of primary color sub-pixel regions P1.

As shown in FIGS. 1 to 3, in the column direction Y, a side of each white sub-pixel W2 is adjacent to at least one primary color sub-pixel S1. In the column direction Y, each white sub-pixel W2 is not adjacent to any other white sub-pixels W2.

For example, as shown in FIG. 2, in the column direction Y, the side of each white sub-pixel W2 is adjacent to a single primary color sub-pixel S1. In this case, in the column direction Y, colors corresponding to two primary color sub-pixels S1 located on two opposite sides of each white sub-pixel W2 are the same. For example, as shown in FIG. 2, in the column direction Y, the colors corresponding to the two primary color sub-pixels S1 located on the two opposite sides of each white sub-pixel W2 are both green.

For example, as shown in FIGS. 1 and 3, the side of each white sub-pixel W2 is adjacent to multiple primary color sub-pixels S1. In this case, in the column direction Y, colors corresponding to two primary color sub-pixels S1 proximate to two opposite sides of each white sub-pixel W2 are different. For example, as shown in FIG. 1, in the column direction Y, the colors corresponding to the two primary color sub-pixels S1 proximate to the two opposite sides of each white sub-pixel W2 are red and blue, respectively.

Figure 4:
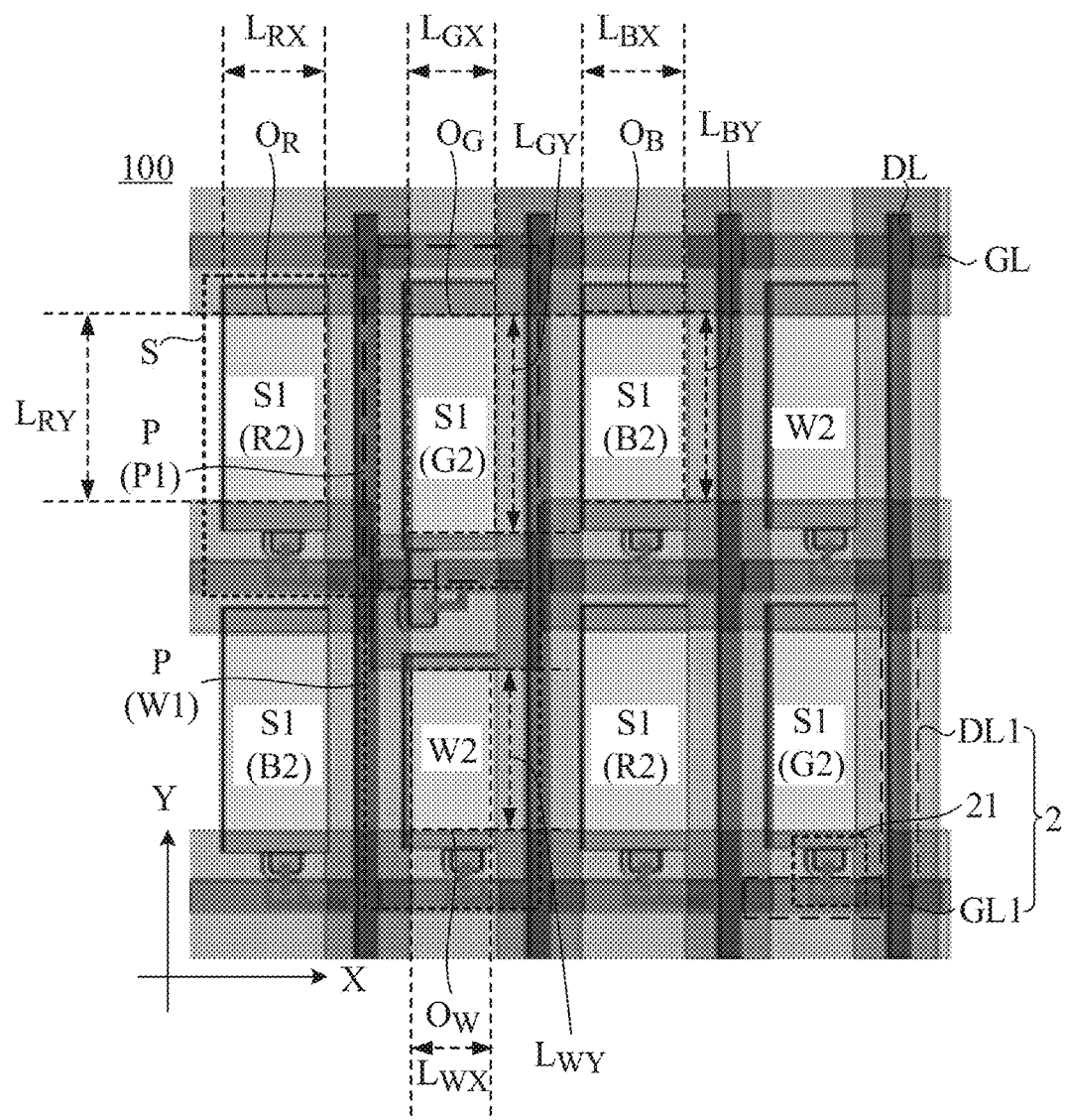
FIG. 4 is a structural diagram of yet another array substrate, in accordance with some embodiments of the present disclosure.

As shown in FIG. 4, each sub-pixel S has a plurality of light-shielding patterns 2. In the column direction Y, in a plurality of light-shielding patterns 2 of a primary color sub-pixel S1 adjacent to the white sub-pixel W2, a part of the light-shielding patterns 2 are disposed in a white sub-pixel region W1 where the white sub-pixel W2 is located, and the other part of the light-shielding patterns 2 are disposed in a primary color sub-pixel region P1 corresponding to the primary color sub-pixel S1.

In some examples, as shown in FIG. 4, pluralities of light-shielding patterns 2 included in multiple primary color sub-pixels S1 other than the primary color sub-pixel S1 adjacent to the white sub-pixel W1 in the column direction Y are respectively disposed in corresponding primary color sub-pixel regions P1.

For example, as shown in FIGS. 2 and 4, in the column direction Y, in an example where the white sub-pixel W2 is adjacent to two green sub-pixels G2, in a plurality of light-shielding patterns 2 of a green sub-pixel G2 of the two green sub-pixels G2, a part of light-shielding patterns 2 are disposed in the white sub-pixel region W1 where the white sub-pixel W2 is located, and the other part of the light-shielding patterns 2 are disposed in a green sub-pixel region G1 where the green sub-pixel G2 is located; in the row direction X, two opposite sides of the white sub-pixel W2 are provided with a red sub-pixel R2 and a blue sub-pixel B2, and two opposite sides of the green sub-pixel G2 are provided with another red sub-pixel R2 and another blue sub-pixel B2; and a plurality of light-shielding patterns 2 included in the red sub-pixel R2 may be located in a red sub-pixel region R1 where the red sub-pixel R2 is located, and a plurality of light-shielding patterns 2 included in a blue sub-pixel B2 may be located in a blue sub-pixel region B1 where the blue sub-pixel B2 is located.

In this way, as shown in FIG. 4, a dimension $L_{WY}$ of an opening $O_W$ of the white sub-pixel W2 in the column direction Y may be reducing, and a dimension $L_{GY}$ of an opening $O_G$ of the green sub-pixel G2 in the column direction Y may be increased. An area of the opening $O_G$ of the green sub-pixel G2 may be increased while an area of the opening $O_W$ of the white sub-pixel W2 is reduced.

It will be noted that the area of the above-mentioned opening refers to a difference between an area occupied by a sub-pixel region P and an area occupied by light-shielding patterns 2 located in the sub-pixel region P.

Therefore, in the array substrate 100 provided by some embodiments of the present disclosure, by setting the arrangement of the plurality of sub-pixels S, in the column direction Y, the side of each white sub-pixel W2 is adjacent to the at least one primary color sub-pixel S1, and the part of the plurality of light-shielding patterns 2 included in the primary color sub-pixel S1 are disposed in the white sub-pixel region W1 where the white sub-pixel W2 is located, and the other part of the plurality of light-shielding patterns 2 are disposed in the primary color sub-pixel region P1 corresponding to the primary color sub-pixel S1, so that the area of the opening of the white sub-pixel W2 may be effectively reduced, and an area of an opening of the primary color sub-pixel S1 adjacent to the white sub-pixel W2 may be increased. It is beneficial to reduce a ratio of an area occupied by the plurality of white sub-pixels W2 to a total area occupied by the plurality of primary color sub-pixels S1 in the array substrate 100. Furthermore, a ratio between brightness of white light displayed by the plurality of white sub-pixels W2 and brightness of white light displayed by the plurality of primary color sub-pixels S1 together is reduced, so that the brightness specification of the white light is avoided being exceeded, and the waste of the white light is reduced or even avoided. Moreover, in a case where the array substrate 100 is applied to an LCD, image quality of a single color image displayed by the LCD may be effectively improved.

In addition, on the basis that in the column direction Y, the part of the plurality of light-shielding patterns 2 of the primary color sub-pixel S1 adjacent to the white sub-pixel W2 are disposed in the white sub-pixel region W1 where the white sub-pixel W2 is located, dimensions of the white sub-pixel W1 and the primary color sub-pixel S1 in the row direction X may be reduced, and dimensions of two primary color sub-pixels S1 disposed on two opposite sides (the two opposite sides in the row direction X) of the primary color sub-pixel S1 in the row direction X are increased. That is, areas of openings of the two primary color sub-pixels S1 are increased, so that the ratio of the area occupied by the plurality of white sub-pixels W2 to the total area occupied by the plurality of primary color sub-pixels S1 in the array substrate 100 may be further reduced, the waste of the white light is further reduced or even avoided, display brightness of the plurality of primary color sub-pixels S1 is improved, and the image quality of the single color image displayed by the LCD may be further improved.

In some embodiments, as shown in FIGS. 4 to 6, the array substrate 100 further includes a plurality of gate lines GL and a plurality of data lines DL, and the plurality of gate lines GL and the plurality of data lines DL are disposed on a side of the first substrate 1. The plurality of gate lines GL extend in or substantially extend in the row direction X, and the plurality of data lines DL extend in or substantially extend in the column direction Y. Here, the plurality of gate lines GL and the plurality of data lines DL cross and are insulated from each other.

In some examples, as shown in FIG. 4, the plurality of light-shielding patterns 2 included in each sub-pixel S include: a portion GL1, passing through the sub-pixel S, of a gate line GL, a portion DL1, passing through the sub-pixel S, of a data line DL, and a thin film transistor 21 electrically connected to the gate line GL and the data line DL and used for driving the sub-pixel S.

This means that, in the row direction X, thin film transistors 21 in multiple sub-pixels in a same row may be electrically connected to a same gate line GL; in the column direction Y, thin film transistors 21 in multiple sub-pixels in a same column may be electrically connected to a same data line DL.

An arrangement of the gate line GL, the data line DL and the thin film transistor 21 includes various types, the arrangement is related to a structure of the thin film transistor 21 (the thin film transistor 21 is a single-gate transistor or a double-gate transistor). Here, in an example where the thin film transistor 21 is the single-gate transistor, the arrangement of the three is schematically described.

For example, as shown in FIGS. 4 to 6, each gate line GL and a plurality of thin film transistors 21 in a same row may be alternately arranged in sequence, and each data line DL and a plurality of thin film transistors 21 in a same column are also alternately arranged in sequence. That is, the plurality of thin film transistors 21 in the same row may be adjacent to two gate lines GL, and the plurality of thin film transistors 21 in the same column may be adjacent to two data lines DL.

For another example, every two gate lines GL and pluralities of thin film transistors 21 in two rows are alternately arranged in sequence, and each data line DL and the plurality of thin film transistors 21 in the same column may also be alternately arranged in sequence. That is, the plurality of thin film transistors 21 in the same row may be adjacent to one gate line GL, and the plurality of thin film transistors 21 in the same column may be adjacent to two data lines DL.

In some examples, as shown in FIG. 4, in the column direction Y, of the plurality of light-shielding patterns 2 of the primary color sub-pixel S1 adjacent to the white sub-pixel W2, the part disposed in the white sub-pixel region W1 where the white sub-pixel W2 is located include: a portion GL1, passing through the primary color sub-pixel S1, of a gate line GL, and/or a thin film transistor 21. That is, the part of the plurality of light-shielding patterns 2 disposed in the white sub-pixel region W1 where the white sub-pixel W2 is located may include the portion GL1, passing through the primary color sub-pixel S1, of the gate line GL, or may include the thin film transistor 21, or may include both the portion GL1, passing through the primary color sub-pixel S1, of the gate line GL, and the thin film transistor 21.

Here, there exits an example where in the column direction Y, the two primary color sub-pixels S1 adjacent to the white sub-pixel W2 are both green sub-pixels G2.

For example, as shown in FIG. 4, the part of the light-shielding patterns 2 disposed in the white sub-pixel region W1 where the white sub-pixel W2 is located include a thin film transistor 21. That is, a thin film transistor 21 in a green sub-pixel G2 is inverted in the white sub-pixel region W1 where the white sub-pixel W2 is located.

In this case, the thin film transistor 21 may occupy a portion of the white sub-pixel W2, so that the area of the opening of the white sub-pixel W2 is reduced, and an area of an opening of the green sub-pixel G2 is increased. In this way, the ratio of the area occupied by the white sub-pixel to the total area occupied by the red sub-pixel, the green sub-pixel and the blue sub-pixel may be effectively adjusted.

It will be noted that, in this case, as shown in FIG. 4, each gate line GL may be linear or substantially linear, and then the gate lines GL and the data lines DL may directly serve as borders of the plurality sub-pixel regions P in the array substrate 100.

For example, as shown in FIGS. 5 and 6, the part of the light-shielding patterns 2 disposed in the white sub-pixel region W1 where the white sub-pixel W2 is located include a portion GL1, passing through the green sub-pixel G2, of a gate line GL. In this case, the portion GL1, passing through the green sub-pixel G2, of the gate line GL is bent toward the white sub-pixel W2, so the gate line GL has a folded line shape as a whole.

In this way, the portion GL1, passing through the green sub-pixel G2, of the gate line GL may occupy a portion of the white sub-pixel W2, so as to reduce the area of the opening of the white sub-pixel W2. Moreover, on the basis that the portion GL1, passing through the green sub-pixel G2, of the gate line GL is bent toward the white sub-pixel W2, the thin film transistor 21 in the green sub-pixel G2 is shifted toward the white sub-pixel W2 accordingly, so that a dimension of the area of the opening of the green sub-pixel G2 is increased. In this way, it may be ensured an adjusting effect on the ratio of the area occupied by the white sub-pixel W2 to the total area occupied by the red sub-pixel R2, the green sub-pixel G2 and the blue sub-pixel B2.

It will be noted that, in this case, as shown in FIGS. 5 and 6, connection lines between unbent portions of each gate line GL and the data lines DL may serve as the borders of the plurality of sub-pixel regions P in the array substrate 100.

For example, as shown in FIGS. 5 and 6, the part of the light-shielding patterns 2 disposed in the white sub-pixel region W1 where the white sub-pixel W2 is located include both the portion GL1, passing through the green sub-pixel G2, of the gate line GL, and the thin film transistor 21. That is, the portion GL1, passing through the green sub-pixel G2, of the gate line GL is bent toward the white sub-pixel W2, so the gate line GL has the folded line shape as a whole; moreover, the thin film transistor 21 in the green sub-pixel G2 is inverted in the white sub-pixel region W1 where the white sub-pixel W2 is located.

In this way, it may further ensure the adjusting effect on the ratio of the area occupied by the white sub-pixel W2 to the total area occupied by the red sub-pixel R2, the green sub-pixel G2 and the blue sub-pixel B2, and in turn, the effect of improving the image quality of the single color image displayed by the LCD to which the array substrate 100 is applied is ensured.

The thin film transistor 21 includes various types. For example, a thin film transistor 21 in at least one sub-pixel S is a top-gate thin film transistor. For another example, a thin film transistor 21 in at least one sub-pixel S is a bottom-gate thin film transistor. Here, in some embodiments of the present disclosure, the thin film transistors 21 in the plurality of sub-pixels S included in the array substrate 100 are all top-gate thin film transistors.

In some examples, as shown in FIGS. 5 to 9, the thin film transistor 21 includes an active layer 211 disposed on a side of the first substrate 1, a gate 212 disposed on a side of the active layer 211 away from the first substrate 1, and a source 213 and a drain 214 that are disposed on a side of the gate 212 away from the first substrate 1. The source 213, the drain 214 and the data lines may be disposed in a same layer.

It will be noted that, the "same layer" mentioned herein refers to a layer structure formed by a film layer for forming specific patterns by a same film forming process and then by one patterning process using a same mask. Depending on different specific patterns, a patterning process may include several exposure, development or etching processes, and the specific patterns in the formed layer structure may be continuous or discontinuous, and these specific patterns may also be at different heights or have different thicknesses. In this way, the plurality of data lines DL and sources 213 and drains 214 of the plurality of thin film transistors 21 may be formed simultaneously, which is beneficial to simplifying the manufacturing process of the array substrate 100.

A shape of an orthogonal projection of the active layer 211 on the first substrate 1 includes various types. For example, as shown in FIGS. 5 and 6, the shape of the orthogonal projection of the active layer 211 on the first substrate 1 is U-shaped.

An opening direction of the active layer 211 may be selectively set according to actual needs, which is not limited in the present disclosure.

For example, opening directions of active layers 211 of all thin film transistors 21 in the array substrate 100 are in a same direction. In this way, it is beneficial to reduce the difficulty of manufacturing the array substrate 100.

In addition, as shown in FIGS. 5 and 6, in the column direction Y, in a case where the thin film transistor 21 of the primary color sub-pixel S1 adjacent to the white sub-pixel W2 is inverted in the white sub-pixel region W1 where the white sub-pixel W2 is located, an opening direction of an active layer 211 of the thin film transistor 21 may be opposite to opening directions of active layers 211 of other thin film transistors 21, so as to ensure the inversion of the thin film transistor 21, and the effect of increasing the area of the opening of the primary color sub-pixel S1. Of course, if the opening direction of the active layer 211 of the inverted thin film transistor 21 is the same as the opening directions of the active layers 211 of other thin film transistors 21, and the area of the opening of the primary color sub-pixel S1 may be increased, then the opening direction of the active layer 211 of the inverted thin film transistor 21 may be the same as the opening directions of the active layers 211 of other thin film transistors 21.

In some embodiments, as shown in FIGS. 5 to 9, the array substrate 100 further includes at least one light-shielding layer LS disposed on a side of each thin film transistor 21 proximate to the first substrate 1. For example, two light-shielding layers LS are provided on the side of each thin film transistor 21 proximate to the first substrate 1. The light-shielding layer LS is configured to shield a conductive channel of an active layer 211 of a corresponding thin film transistor 21.

In some embodiments, in the plurality of primary color sub-pixels S1 included in the array substrate 100, a ratio of areas of openings of the first color sub-pixel S11, the second color sub-pixel S12, the third color sub-pixel S13 and the white sub-pixel W2 is in a range of (0.8 to 1.2):(0.8 to 1.2):(0.8 to 1.2):(0.4 to 0.8).

Here, in the column direction Y, the two primary color sub-pixels S1 adjacent to the white sub-pixel W2 are both second color sub-pixels S12, and in the row direction X, a first color sub-pixel S11 and a third color sub-pixel S13 are respectively disposed on two opposite sides of the second color sub-pixel S12. In the column direction Y, a part of light-shielding patterns 2 included in a second color sub-pixel S12 adjacent to the white sub-pixel W2 are disposed in the white sub-pixel region W1 where the white sub-pixel W2 is located; alternatively, based on this, dimensions of the white sub-pixel W1 and the second color sub-pixel S12 in the row direction X are reduced, and dimensions of the first color sub-pixel S11 and the third color sub-pixel S13 in the row direction X are increased, so that the ratio of the areas of the openings the first color sub-pixel S11, the second color sub-pixel S12, the third color sub-pixel S13 and the white sub-pixel W2 is made to be within the above range, and the ratio between the brightness of the white light displayed by the plurality of white sub-pixels W2 and the brightness of the white light displayed by the plurality of primary color sub-pixels S1 together is in a range of 2:5 to 6:5, inclusive. In this way, it may reduce or even avoid the waste of white light. Moreover, it is beneficial to improve the image quality of the single color image displayed by the LCD to which the above-mentioned array substrate 100 is applied.

For example, the ratio of the areas of the openings of the first color sub-pixel S11, the second color sub-pixel S12, the third color sub-pixel S13 and the white sub-pixel W2 may be 1:1:1:½, 1:1:1:27/50, 1:1:1:11/20 or 1:1:1:⅔.

It will be noted that each numerical value in the above proportional range is only for representing a degree of fluctuation compared to the numerical value 1, and does not represent an actual value of an area of an opening of each sub-pixel.

In the following, by considering an example where the first color sub-pixel S11 includes the red sub-pixel R2, the second color sub-pixel S12 includes the green sub-pixel G2, and the third color sub-pixel S13 includes the blue sub-pixel B2, a dimension relationship between the three and the white sub-pixel W2 will be schematically illustrated. As shown in FIG. 2, an arrangement of the red sub-pixels R2, the green sub-pixels G2, the blue sub-pixels B2 and the white sub-pixels W2 may be, for example, in the column direction Y, a white sub-pixel W2 and a green sub-pixel G2 are adjacent; in the row direction X, a red sub-pixel R2 and a blue sub-pixel B2 are located on two opposite sides of a green sub-pixel G2.

In some examples, as shown in FIG. 4, in the row direction X, a dimension (e.g., represented as $L_{RX}$) of an opening $O_R$ of the red sub-pixel R2 and a dimension (e.g., represented as $L_{BX}$) of an opening $O_B$ of the blue sub-pixel B2 are equal or substantially equal, the dimension $L_{RX}$ of the opening $O_R$ of the red sub-pixel R2 is greater than a dimension (e.g., represented as $L_{GX}$) of an opening $O_G$ of the green sub-pixel G2, and the dimension $L_{GX}$ of the opening $O_G$ of the green sub-pixel G2 is greater than a dimension (e.g., represented as $L_{WX}$) of an opening $O_W$ of the white sub-pixel W2. That is, $L_{RX}=L_{BX}>L_{GX}>L_{WX}$. In the column direction Y, a dimension (e.g., represented as $L_{GY}$) of the opening $O_G$ of the green sub-pixel G2 is greater than a dimension (e.g., represented as $L_{RY}$) of the opening $O_R$ of the red sub-pixel R2, the dimension $L_{RY}$ of the opening $O_R$ of the red sub-pixel R2 and a dimension (e.g., represented as $L_{BY}$) of the opening $O_B$ of the blue sub-pixel B2 are equal or substantially equal, and the dimension $L_{RY}$ of the opening $O_R$ of the red sub-pixel R2 is greater than a dimension (e.g., represented as $L_{WY}$) of the opening $O_W$ of the white sub-pixel W2. That is, $L_{GY}>L_{RY}=L_{BY}>L_{WY}$.

In this way, it may be ensured that the areas of the openings of the red sub-pixel R2, the green sub-pixel G2 and the blue sub-pixel B2 are equal or substantially equal, and the areas of the openings of the three are greater than the area of the opening of the white sub-pixel W2.

It will be noted that a dimension of an opening of each sub-pixel S in the row direction X, for example, may refer to a maximum dimension in the row direction X, or may refer to a minimum dimension in the row direction X, or may refer to an average dimension in the row direction X.

In some examples, in the row direction X, a ratio of the dimension $L_{RX}$ of the opening $O_R$ of the red sub-pixel R2, the dimension $L_{GX}$ of the opening $O_G$ of the green sub-pixel G2, the dimension $L_{BX}$ of the opening $O_B$ of the blue sub-pixel B2 and the dimension $L_{WX}$ of the opening $O_W$ of the white sub-pixel W2 is in a range of (1.4 to 1.5):(1.2 to 1.4):(1.4 to 1.5):1; in the column direction Y, a ratio of the dimension $L_{RY}$ of the opening $O_R$ of the red sub-pixel R2, the dimension $L_{GY}$ of the opening $O_G$ of the green sub-pixel G2, the dimension $L_{BY}$ of the opening $O_B$ of the blue sub-pixel B2 and the dimension $L_{WY}$ of the opening $O_W$ of the white sub-pixel W2 is in a range of (1.2 to 1.3):(1.3 to 1.8):(1.2 to 1.3):1.

For example, the ratio of $L_{RX}$, $L_{GX}$, $L_{BX}$, and $L_{WX}$ may be 1.4:1.2:1.4:1, 1.42:1.23:1.45:1, or 1.5:1.4:1.5:1. For example, $L_{RX}$ may be 22 μm, $L_{GX}$ may be 21 μm, $L_{BX}$ may be 22 μm, and $L_{WX}$ may be 15 μm.

For example, the ratio of $L_{RY}$, $L_{GY}$, $L_{BY}$, and $L_{WY}$ may be 1.2:1.3:1.2:1, 1.25:1.4:1.26:1, or 1.3:1.8:1.3:1. For example, $L_{RY}$ may be 50.4 μm, $L_{GY}$ may be 54.6 μm, $L_{BY}$ may be 50.4 μm, and $L_{WY}$ may be 42 μm.

In the present disclosure, by setting the ratio of $L_{RX}$, $L_{GX}$, $L_{BX}$, and $L_{WX}$ in the row direction X and the ratio of $L_{RY}$, $L_{GY}$, $L_{BY}$, and $L_{WY}$, white point coordinates of the red sub-pixel R2, the green sub-pixel G2 and the blue sub-pixel B2 are ensured while decreasing the brightness of the white light displayed by the white sub-pixel W2 and increasing the brightness of the white light displayed by the red sub-pixel R2, the green sub-pixel G2 and the blue sub-pixel B2 together. For example, the white point coordinates may be (0.299, 0.315).

In some embodiments, as shown in FIGS. 5 and 6, the array substrate 100 further includes a plurality of common electrode lines VL extending in the column direction Y.

Figure 8:
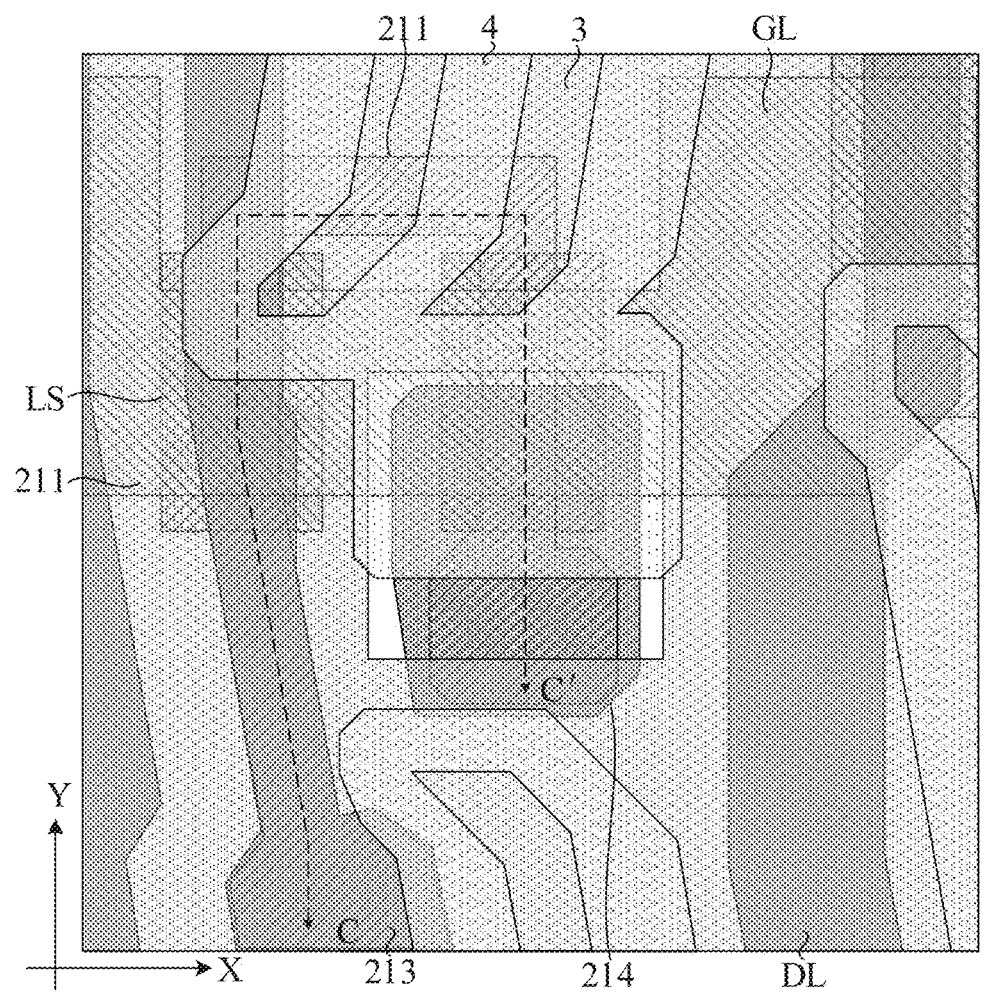
FIG. 8 is a partial structural diagram of the array substrate shown in FIG. 7.
Figure 9:
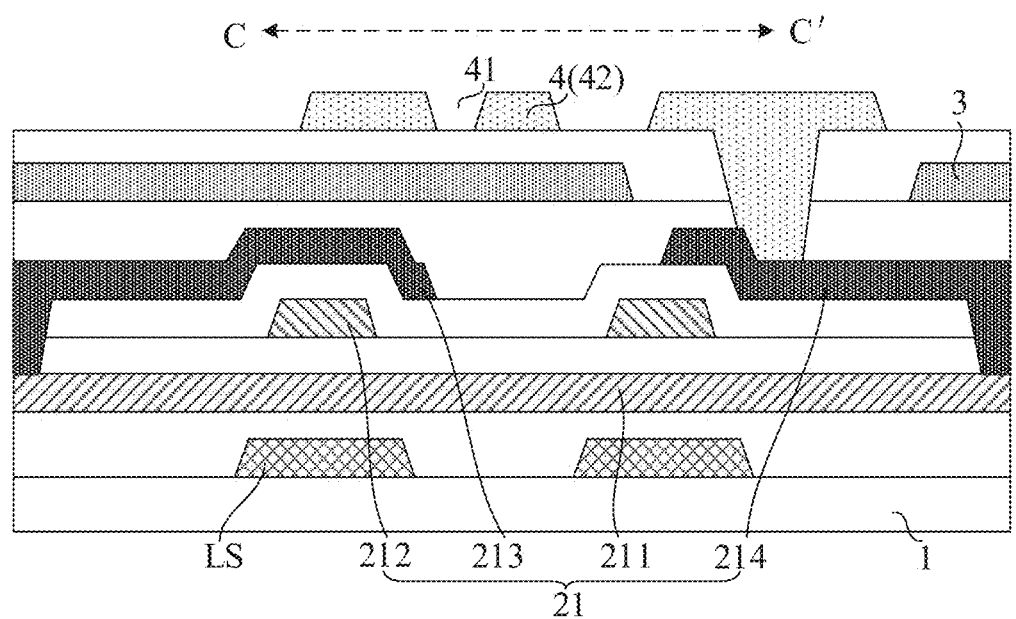
FIG. 9 is a sectional view of the structure shown in FIG. 8 taken along the C-C' direction.

In some examples, as shown in FIGS. 6 to 8, each sub-pixel S further includes a common electrode 3 disposed on a side of the plurality of light-shielding patterns 2 away from the first substrate 1. The common electrode is electrically connected to at least one common electrode line VL. In this case, the at least one common electrode line VL may be used to transmit a common voltage signal to the common electrode 3.

Here, a relationship between the common electrode 3 and the common electrode line VL includes various types, which may be selectively set according to actual needs.

For example, common electrodes 3 may be electrically connected to the common electrode lines VL in one-to-one correspondence. In this way, the number of the common electrode lines VL may be reduced, and in turn, a space ratio of the common electrode lines VL in the array substrate 100 is reduced.

For example, each common electrode 3 may be electrically connected to multiple common electrode lines VL. In this way, in a case where a connection between a common electrode line VL in the multiple common electrode lines VL and the common electrode 3 is abnormal, other common electrode lines VL may also be used to transmit the common voltage signal to the common electrode 3, which is beneficial to improve the reliability between the common electrode 3 and the common electrode lines VL.

A relationship between the common electrode 3 and the sub-pixel S includes various types, which may be selectively set according to actual needs.

For example, the common electrodes 3 and the sub-pixels S are in one-to-one correspondence. That is, each sub-pixel S includes a single common electrode 3. In this way, each sub-pixel S may be provided with a common voltage signal independently, so as to avoid a situation of cross-talk between common voltage signals in different sub-pixels S.

For example, as shown in FIGS. 5 and 6, each common electrode 3 corresponds to multiple sub-pixels S. In this case, common electrodes 3 in the multiple sub-pixels S are electrically connected to one another, so as to form an integrated structure. This is beneficial to simplify a process difficulty of forming the common electrodes 3.

Here, the number of the sub-pixels S corresponding to each common electrode 3 may be selectively set according to actual needs. For example, each common electrode 3 may correspond to two sub-pixels S, three sub-pixels S, or four sub-pixels S.

Figure 10:
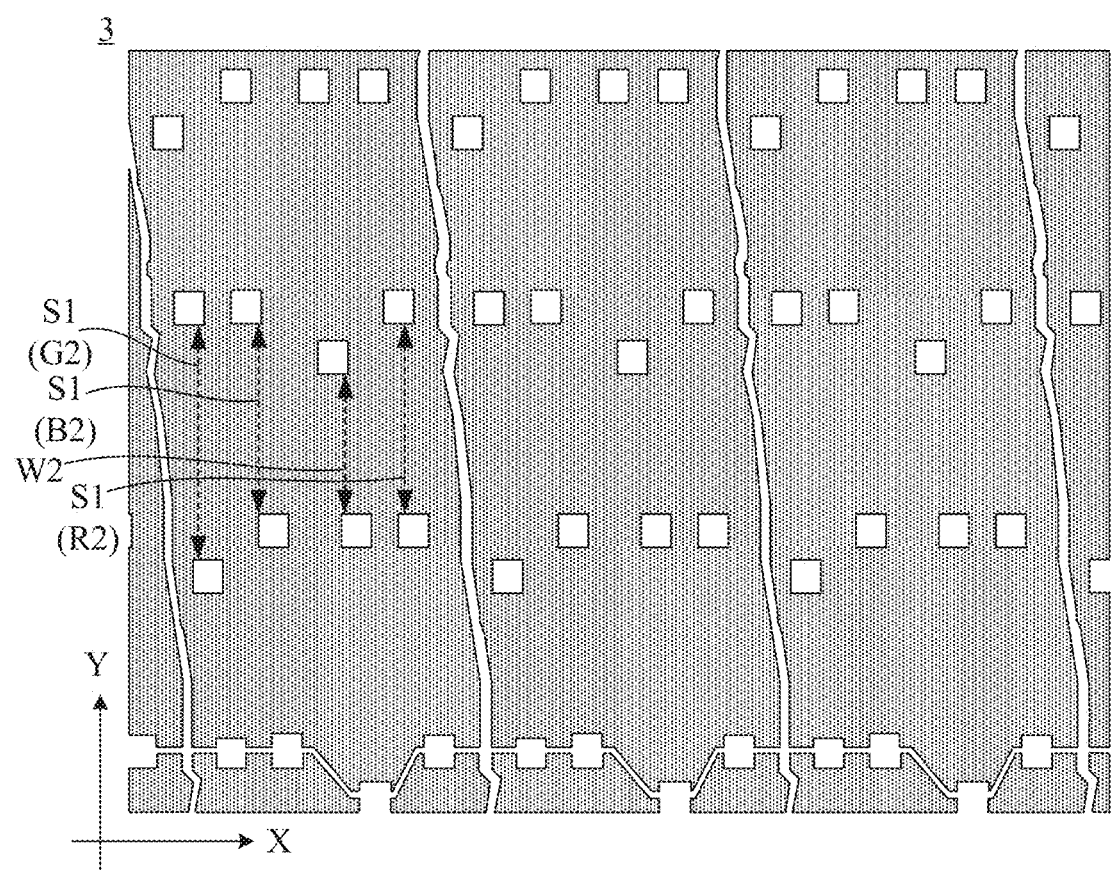
FIG. 10 is a structural diagram of a common electrode, in accordance with some embodiments of the present disclosure.

Alternatively, as shown in FIG. 10, in all common electrodes 3 included in the array substrate 100, each common electrode 3 may correspond to sixteen sub-pixels S. In the sixteen sub-pixels S, four sub-pixels S (e.g., which include a red sub-pixel R2, a green sub-pixel G2, a blue sub-pixel B2 and a white sub-pixel W2) arranged in sequence in the row direction X constitute a group of sub-pixels, and four groups of sub-pixels are arranged in sequence in the column direction Y. Based on this, the plurality of common electrodes 3 may be arranged in an array, and in the column direction Y, multiple common electrodes 3 in each column may be electrically connected to, for example, a single common electrode line VL.

Figure 11:
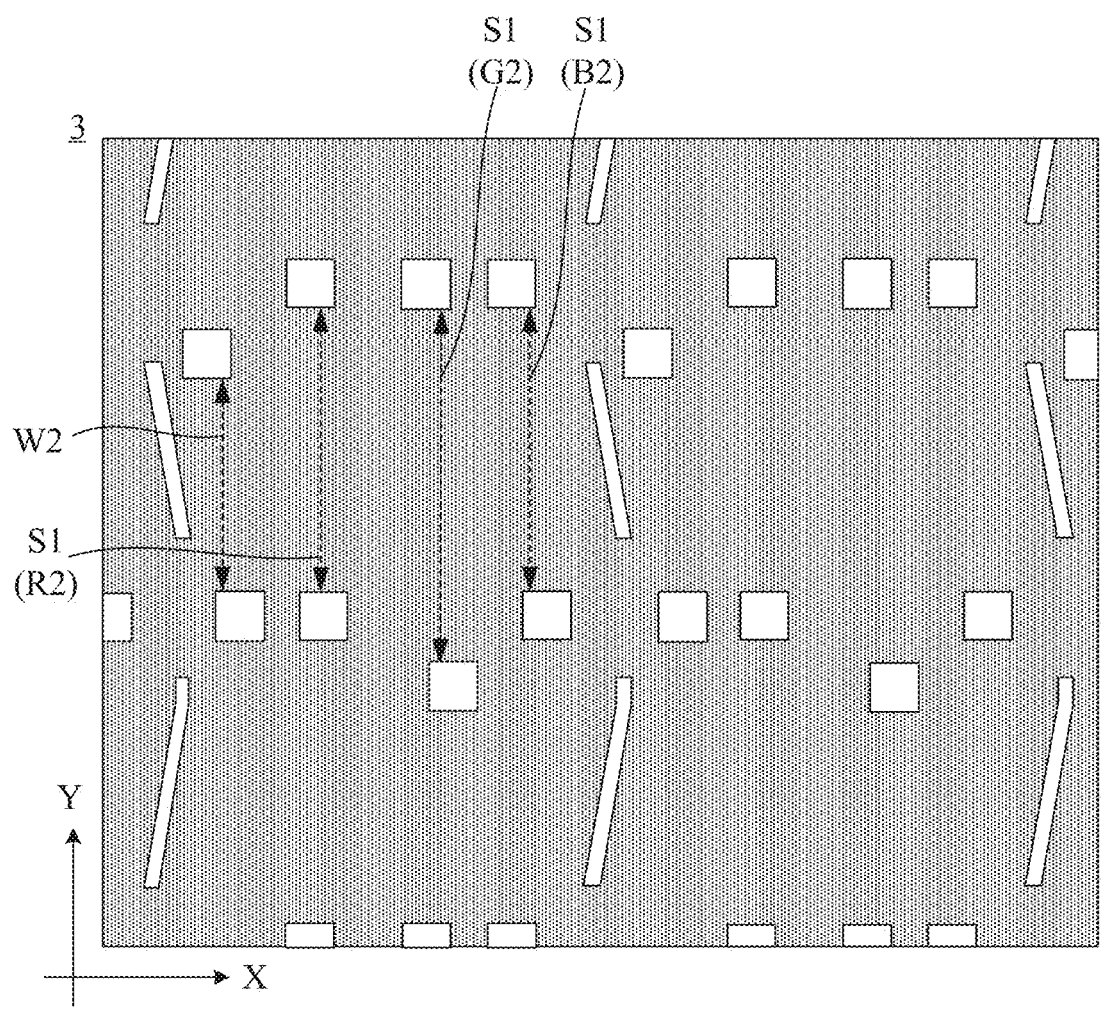
FIG. 11 is a structural diagram of another common electrode, in accordance with some embodiments of the present disclosure.

In a case where each common electrode 3 corresponds to the multiple sub-pixels S, common electrodes 3 in the plurality of sub-pixels S may be adopt a connection, for example, as shown in FIG. 10, or adopt a connection, for example, as shown in FIG. 11.

A positional relationship between the pluralities of common electrode lines VL and sub-pixels S includes various types. Here, by considering an example where the plurality of primary color sub-pixels S1 include the plurality of red sub-pixels R2, the plurality of green sub-pixels G2 and the plurality of blue sub-pixels B2, and the arrangement between the pluralities of primary color sub-pixels S1 and white sub-pixels W2 is as shown in FIG. 2, each common electrode line VL may be disposed between, for example, red sub-pixels R2 and green sub-pixels G2 and between blue sub-pixels B2 and white sub-pixels W2. Alternatively, each common electrode line VL may be located between red sub-pixels R2 and white sub-pixels W2 and between green sub-pixels G2 and blue sub-pixels B2.

A positional relationship between the pluralities of common electrode lines VL and common electrodes 3 includes various types. For example, as shown in FIGS. 6 and 7, the plurality of common electrode lines VL and the data lines DL included in the array substrate 100 are disposed in a same layer. In this case, the plurality of common electrode lines VL are located on a side of the common electrodes 3 proximate to the first substrate 1.

By providing the common electrode lines VL and the data lines DL in the same layer, the common electrode lines VL and the data lines DL may be manufactured in a single pattern process simultaneously, which is beneficial to simplify the manufacturing process of the array substrate 100. Moreover, since the common electrode lines VL and the data lines DL have a same extending direction, by providing the common electrode lines VL and the data lines DL in the same layer, a case where the common electrode lines VL and the data lines DL cross to cause a short circuit may be avoided, in addition, the number of film layers included in the array substrate 100 may be reduced, so as to avoid increasing a thickness of the array substrate 100.

In some examples, as shown in FIG. 5 or 6, a ratio of a dimension $L_{VL}$ of each common electrode line VL in a direction perpendicular to the column direction Y and a dimension $L_{DL}$ of a data line DL in the direction perpendicular to the column direction Y is in a range of 1:2 to 1:1.

Here, ratios of the dimension $L_{VL}$ of each common electrode line VL in the direction perpendicular to the column direction Y and dimensions $L_{DL}$ of different data lines DL in the direction perpendicular to the column direction Y may be same or different.

For example, the ratios of the dimension of each common electrode line VL in the direction perpendicular to the column direction Y and the dimensions of the different data lines DL in the direction perpendicular to the column direction Y are the same. In this case, the ratio may be, for example, 1:2, 1:3/2 or 1:1.

Figure 14:
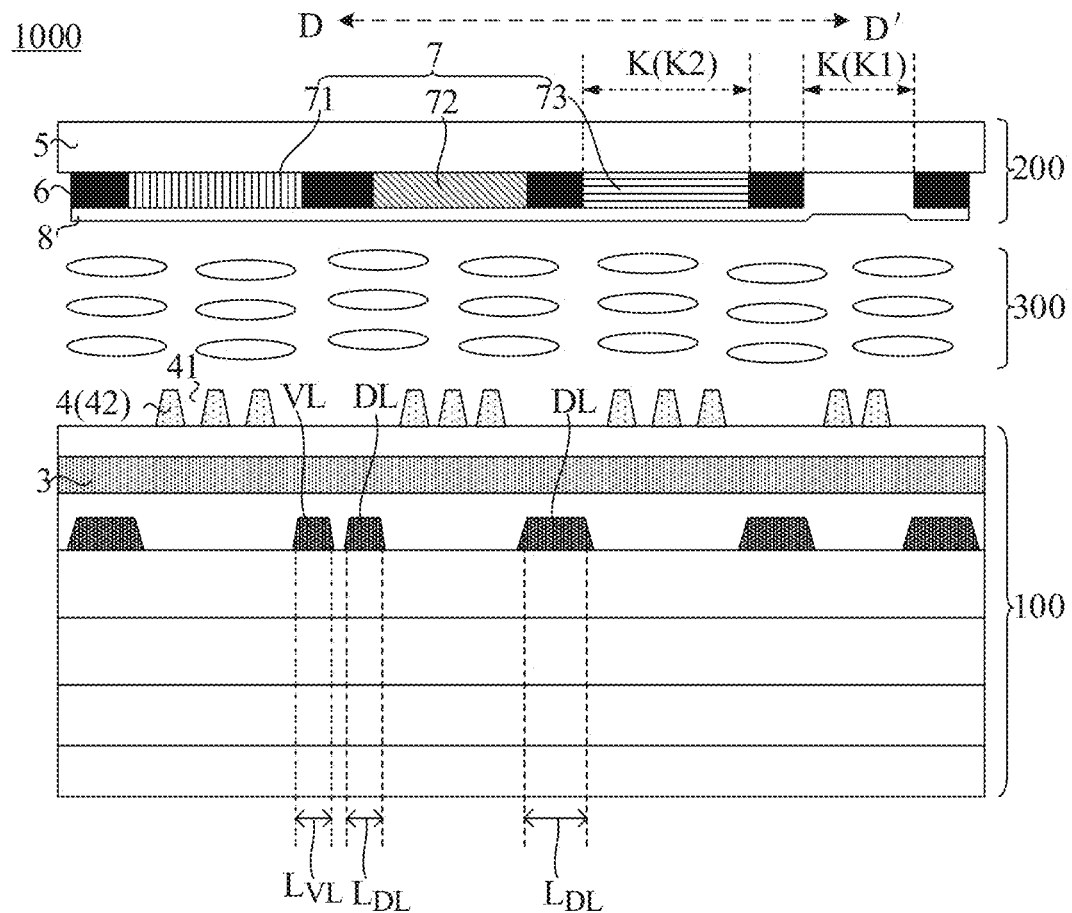
FIG. 14 is a sectional view of the display apparatus shown in FIG. 13 taken along the D-D' direction.

For example, the ratios of the dimension $L_{VL}$ of each common electrode line VL in the direction perpendicular to the column direction Y and the dimensions $L_{DL}$ of the different data lines DL in the direction perpendicular to the column direction Y are different. For example, as shown in FIGS. 6 and 14, a ratio of the dimension $L_{VL}$ of each common electrode line VL in the direction perpendicular to the column direction Y and dimensions $L_{DL}$ of a part of the data lines DL (e.g., a data line DL adjacent to the common electrode line VL, and no other structures are disposed between the two) in the direction perpendicular to the column direction Y is 1:1, and a ratio of the dimension $L_{VL}$ of each common electrode line VL in the direction perpendicular to the column direction Y and dimensions $L_{DL}$ of the other part of the data lines DL in the direction perpendicular to the column direction Y is 1:2.

It will be noted that the dimension $L_{VL}$ of each common electrode line VL in the direction perpendicular to the column direction Y may refer to, for example, an average dimension $L_{VL}$ of each common electrode line VL in the direction perpendicular to the column direction Y, and the dimension $L_{DL}$ of the data line DL in the direction perpendicular to the column direction Y may refer to, for example, an average dimension $L_{DL}$ of each data line DL in the direction Y perpendicular to the column.

In some examples, the common electrode 3 also serves as a touch electrode, and the common electrode line VL also serves as a touch signal line.

Base on this, the array substrate 100 provided by some embodiments of the present disclosure may be applied to a LCD of a self-capacitance mode, and the LCD may realize a display function and a touch control function in different time periods.

In a display period, the common electrode line VL may be used to transmit a common voltage signal to the common electrode 3.

In a touch period, the common electrode line VL may be used to input a signal (e.g., a touch detection signal) to the common electrode 3, and output a signal (e.g., a capacitance signal) from the common electrode 3. In this case, when a human body does not touch the LCD, a capacitance provided by each common electrode is at a fixed value; and when the human body touches the LCD, a capacitance provided by a common electrode corresponding to a position touched by the human body is at a sum of the fixed value and a capacitance value of the human body, and then capacitance values of all common electrodes may be transmitted by the common electrode lines VL, so that the position touched by the human body may be determined by detecting a change of a capacitance value of each common electrode 3.

In some embodiments, as shown in FIGS. 6 to 9, each sub-pixel S further includes a pixel electrode 4 disposed on a side of the common electrode 3 away from the first substrate 1. The pixel electrode 4 is electrically connected to a source 213 or a drain 214 of a thin film transistor 21 in the same sub-pixel S.

In some examples, as shown in FIGS. 6 and 7, each pixel electrode 4 is electrically connected to a drain 214 of a thin film transistor 21 in a same sub-pixel S, and a source 213 of the thin film transistor 21 is electrically connected to a corresponding data line DL. In this case, in a case where the thin film transistor 21 is turned on, a data voltage signal on the data line DL may be transmitted to the pixel electrode 4 through the source 213 and the drain 214 in sequence.

In some examples, as shown in FIGS. 6 and 7, the second electrode 4 has at least one slit 41. That is, the pixel electrode 4 may have a single slit 41 or may have a plurality of slits 41.

For example, a pixel electrode 4 in the white sub-pixel W2 has one slit 41, and a pixel electrode 4 in each primary color sub-pixel S1 has two slits 41.

By providing the at least one slit 41 in the pixel electrode 4, in a case where in the same sub-pixel S, the common electrode 3 has a common voltage signal and the pixel electrode 4 has a data voltage signal, it is possible to make a portion of an electric field generated between the common electrode 3 and the pixel electrode 4 on a side of the pixel electrode 4 away from the common electrode 3 through the at least one slit. In the case where the array substrate 100 is applied to the LCD, the portion of the electric field on the side of the pixel electrode 4 away from the common electrode 3 may be used to drive liquid crystal molecules to rotate, so that the LCD may realize image display.

In some examples, materials of the common electrode 3 and the pixel electrode 4 may adopt a conductive material with a high light transmittance. For example, the conductive material may be indium tin oxide (ITO), indium zinc oxide (IZO) or the like. In this way, it may avoid affecting the display effect of the LCD.

In some examples, as shown in FIGS. 5 and 6, an extending direction $E_{41}$ of the at least one slit 41 may be at an acute angle A to the column direction Y. Alternatively, the extending direction $E_{41}$ of the at least one slit 41 may be parallel to the column direction Y.

In some examples, as shown in FIGS. 6 to 9, the pixel electrode 4 includes strip-shaped sub-electrodes 42 located on both sides of each slit 41. For example, in a case where the pixel electrode 4 has one slit 41, the pixel electrode 4 may include two strip-shaped sub-electrodes 42; in a case where the pixel electrode 4 has two slits 41, the pixel electrode 4 may include three strip-shaped sub-electrodes 42, that is, the number of the strip-shaped sub-electrodes 42 is one more than the number of slits 41.

In some examples, in a case where the plurality of primary color sub-pixels S1 include the plurality of red sub-pixels R2, the plurality of green sub-pixels G2, and the plurality of blue sub-pixels B2, as shown in FIGS. 5 and 6, in the row direction X, a range of a ratio between a dimension $L_{41X}$ of a slit 41 and a dimension $L_{42X}$ of a stripe-shaped sub-electrode 42 of a pixel electrode 4 in the white sub-pixel W2 is the same or substantially the same as a range of a ratio between a dimension $L_{41X}$ of a slit 41 and a dimension $L_{42X}$ of a stripe-shaped sub-electrode 42 of a pixel electrode 4 in the green sub-pixel G2.

In the row direction X, the dimension $L_{41X}$ of the slit 41 of the pixel electrode 4 in the white sub-pixel W2 is the same or substantially the same as the dimension $L_{41X}$ of the slit 41 of the pixel electrode 4 in the green sub-pixel G2; and the dimension $L_{42X}$ of the strip-shaped sub-electrode 42 of the pixel electrode 4 in the white sub-pixel W2 is the same or substantially the same as the dimension $L_{42X}$ of the strip-shaped sub-electrode 42 of the pixel electrode 4 in the green sub-pixel G2. In this way, the data lines DL may be prevented from having a folded line shape.

For example, in the row direction X, the ratio of the dimension $L_{41X}$ of the slit 41 and the dimension $L_{42X}$ of the strip-shaped sub-electrode 42 of the pixel electrode 4 in the white sub-pixel W2 is in a range of (2.4 to 2.8):(2.0 to 2.7). In this case, the ratio of the dimension $L_{41X}$ of the slit 41 and the dimension $L_{42X}$ of the strip-shaped sub-electrode 42 in the pixel electrode 4 of the green sub-pixel G2 may also be in the range of (2.4 to 2.8):(2.0 to 2.7).

For example, in the row direction X, the dimension $L_{41X}$ of the slit 41 of the pixel electrode 4 in the white sub-pixel W2 is 2.4 μm, and the dimension $L_{42X}$ of the strip-shaped sub-electrode 42 of the pixel electrode 4 in the white sub-pixel W2 is 2.0 μm, in this case, the ratio between the two is 2.4:2.0. For another example, in the row direction X, the dimension $L_{41X}$ of the slit 41 of the pixel electrode 4 in the white sub-pixel W2 is 2.8 μm, and the dimension $L_{42X}$ of the strip-shaped sub-electrode 42 of the pixel electrode 4 in the white sub-pixel W2 is 2.7 μm, in this case, the ratio between the two is 2.8:2.7. For yet another example, in the row direction X, the dimension $L_{41X}$ of the slit 41 of the pixel electrode 4 in the white sub-pixel W2 is 2.6 μm, and the dimension $L_{42X}$ of the strip-shaped sub-electrode 42 of the pixel electrode 4 in the white sub-pixel W2 is 2.5 μm, in this case, the ratio between the two is 2.6:2.5.

In some examples, in the case where the plurality of primary color sub-pixels S1 include the plurality of red sub-pixels R2, the plurality of green sub-pixels G2 and the plurality of blue sub-pixels B2, as shown in FIGS. 5 and 6, in the row direction X, a range of a ratio between a dimension $L_{41X}$ of a slit 41 and a dimension $L_{42X}$ of a stripe-shaped sub-electrode 42 of a pixel electrode 4 in the red sub-pixel R2 is the same or substantially the same as a range of a ratio between a dimension $L_{41X}$ of a slit 41 and a dimension $L_{42X}$ of a stripe-shaped sub-electrode 42 of a pixel electrode 4 in the blue sub-pixel B2.

In the row direction X, the dimension $L_{41X}$ of the slit 41 of the pixel electrode 4 in the red sub-pixel R2 is the same or substantially the same as the dimension $L_{41X}$ of the slit 41 of the pixel electrode 4 in the blue sub-pixel B2; and the dimension $L_{42X}$ of the strip-shaped sub-electrode 42 of the pixel electrode 4 in the red sub-pixel R2 is the same or substantially the same as the dimension $L_{42X}$ of the strip-shaped sub-electrode 42 of the pixel electrode 4 in the blue sub-pixel B2. In this way, the data lines DL may be prevented from having a folded line shape.

For example, in the row direction X, the ratio between the dimension $L_{41X}$ of the slit 41 and the dimension $L_{42X}$ of the stripe-shaped sub-electrode 42 of the pixel electrode 4 in the red sub-pixel R2 is in a range of (2.2 to 2.8):(2.0 to 2.5). In this case, the ratio between the dimension $L_{41X}$ of the slit 41 and the dimension $L_{42X}$ of the stripe-shaped sub-electrode 42 of the pixel electrode 4 in the blue sub-pixel B2 may also be in the range of (2.2 to 2.8):(2.0 to 2.5).

For example, in the row direction X, the dimension $L_{41X}$ of the slit 41 of the pixel electrode 4 in the red sub-pixel R2 is 2.8 μm, and the dimension $L_{42X}$ of the strip-shaped sub-electrode 42 of the pixel electrode 4 in the red sub-pixel R2 is 2.0 μm, in this case, the ratio between the two is 2.8:2.0. For another example, in the row direction X, the dimension $L_{41X}$ of the slit 41 of the pixel electrode 4 in the red sub-pixel R2 is 2.2 μm, and the dimension $L_{42X}$ of the strip-shaped sub-electrode 42 of the pixel electrode 4 in the red sub-pixel R2 is 2.5 μm, in this case, the ratio between the two is 2.2:2.5. For yet another example, in the row direction X, the dimension $L_{41X}$ of the slit 41 of the pixel electrode 4 in the red sub-pixel R2 is 2.4 μm, and the dimension $L_{42X}$ of the strip-shaped sub-electrode 42 of the pixel electrode 4 in the red sub-pixel R2 is 2.3 μm, in this case, the ratio between the two is 2.4:2.3.

By setting a dimension relationship between the slit 41 and the strip-shaped sub-electrode 42 of the pixel electrode 4 in each sub-pixel S in the row direction X, it may be ensured that the portion of the electric field generated on the side of the pixel electrode 4 away from the common electrode 3 is a parallel electric field or substantially a parallel electric field. In this way, in the case where the array substrate 100 is applied to the LCD, it may be ensured that the liquid crystal molecules in the LCD may generate an angular deflection in a direction parallel to a plane where the LCD is located due to an action of the portion of the electric field, so as to change polarization state of polarized light.

It will be noted that, in the row direction X, the dimension $L_{41X}$ of the slit 41 and the dimension $L_{42X}$ of the strip-shaped sub-electrode 42 of each pixel electrode 4, for example, refer to maximum dimensions in the row direction X, or refer to minimum dimensions in the row direction, or refer to average dimensions in the row direction X.

Figure 12:
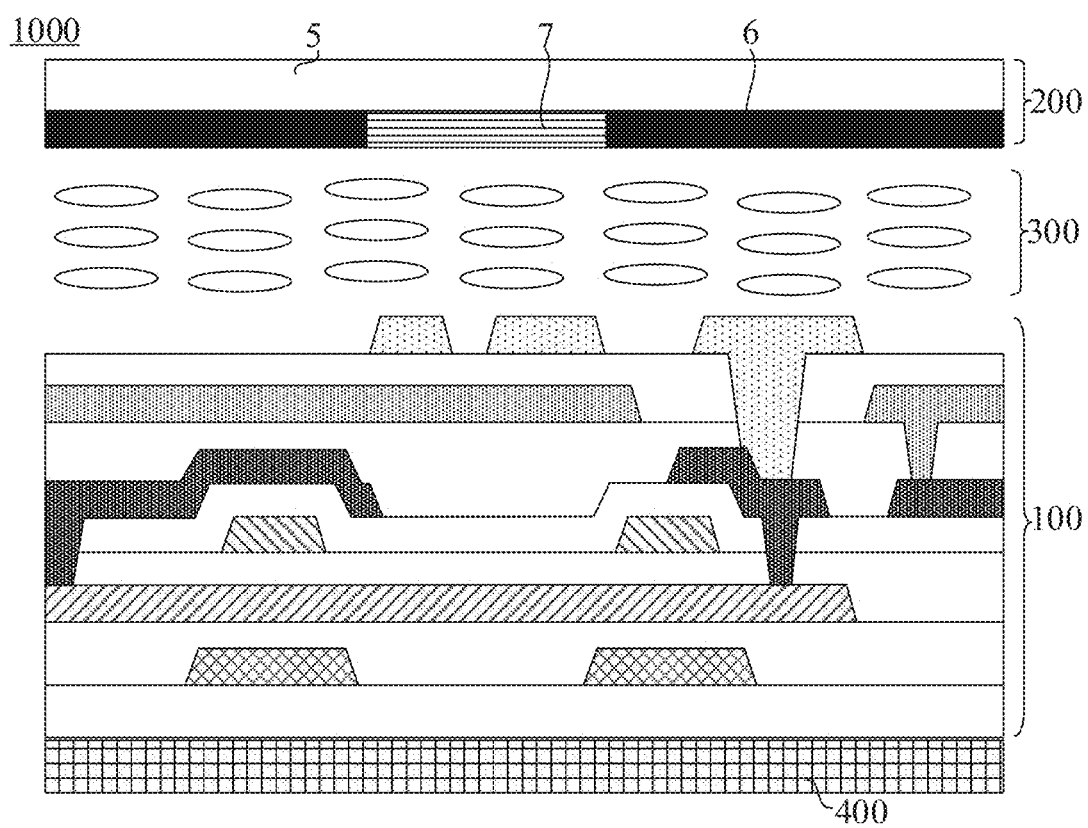
FIG. 12 is a structural diagram of a display apparatus, in accordance with some embodiments of the present disclosure.

Some embodiments of the present disclosure provide a display apparatus 1000. As shown in FIG. 12, the display apparatus 1000 includes: the array substrate 100 as described in any one of the above embodiments, a counter substrate 200 disposed opposite to the array substrate 100 and a liquid crystal layer 300 disposed between the array substrate 100 and the counter substrate 200.

In some examples, the liquid crystal layer 300 includes a plurality of liquid crystal molecules. During the display process of the display apparatus 1000, the electric field generated between the pixel electrodes 4 and the common electrodes 3 in the array substrate 100 may drive the liquid crystal molecules in the liquid crystal layer 300 to rotate, so that the display apparatus 1000 may achieve image display.

In some examples, as shown in FIG. 12, the display apparatus 1000 further includes a backlight 400 provided on a side of the array substrate 100 away from the counter substrate 200. The backlight 400 is configured to provide a light source required for image display to the display apparatus 1000.

The beneficial effects that may be achieved by the display apparatus 1000 provided in some embodiments of the present disclosure are the same as the beneficial effects that may be achieved by the array substrate 100 provided in some of the above embodiments, and will not be repeated herein.

It will be noted that in a case where the ratio between the brightness of the white light displayed by the plurality of white sub-pixels W2 and the brightness of the white light displayed by the plurality of primary color sub-pixels S1 together in the array substrate 100 is reduced, display brightness of the display apparatus 1000 may still be improved. For example, in the display apparatus 1000 provided in some embodiments of the present disclosure, the display brightness may be improved by 3% compared with a common LCD.

In addition, in a case where the array substrate 100 provided in some of the above embodiments is applied to the display apparatus 1000, it is beneficial to improve resistance to misalignment between the array substrate 100 and the counter substrate 200. For example, in a case where an alignment shift occurs between the array substrate 100 and the counter substrate 200, the display apparatus 1000 provided in some embodiments of the present disclosure may be improved by 2% compared with the common LCD.

In some embodiments, as shown in FIGS. 12 and 14, the counter substrate 200 includes a second substrate 5.

Here, the second substrate 5 may have, for example, a same structure as the first substrate 1.

In some embodiments, as shown in FIGS. 12 and 14, the counter substrate 200 further includes a black matrix 6 disposed on a side of the second substrate 5 proximate to the array substrate 100. The black matrix 6 has a plurality of openings K. The plurality of openings K include a plurality of first openings K1 respectively opposite to the plurality of white sub-pixels W2 in the array substrate 100 and a plurality of second openings K2 respectively opposite to the plurality of primary color sub-pixels S1 in the array substrate 100.

In some examples, the black matrix 6 is configured to shield the plurality of gate lines GL, the plurality of data lines DL and the plurality of thin film transistors 21 in the array substrate 100.

For example, orthogonal projections of the plurality of thin film transistors 21 on the first substrate 1 may be within a range of an orthogonal projection of the black matrix 6 on the first substrate 1. In this way, the black matrix 6 may be used to block the external light emitted to the plurality of thin film transistors 21, so as to prevent the external light from adversely affecting the performance of the plurality of thin film transistors 21.

For example, orthogonal projections of the plurality of gate lines GL and the plurality of data lines DL on the first substrate 1 may be located within the range of the orthogonal projection of the black matrix 6 on the first substrate 1. In this way, the black matrix 6 may be used to block the external light emitted to the plurality of gate lines GL and the plurality of data lines DL, so as to avoid reflection of the external light off the plurality of gate lines GL and the plurality of data lines DL, which is beneficial to make the display apparatus 1000 have a high contrast ratio.

As shown in FIG. 14, the orthogonal projection of the black matrix 6 on the first substrate 1 may be located within a range of the orthogonal projections of the plurality of gate lines GL and the plurality of data lines DL on the first substrate 1, that is, the black matrix 6 does not completely block the plurality of gate lines GL and the plurality of data lines DL. In this way, the reflection of the external light off the plurality of gate lines GL and the plurality of data lines DL may be reduced, an area of the orthogonal projection of the black matrix 6 on the first substrate 1 may be reduced, areas of the plurality of openings K included in the black matrix 6 are increased, and an aperture ratio of the display apparatus 1000 is improved.

Figure 13:
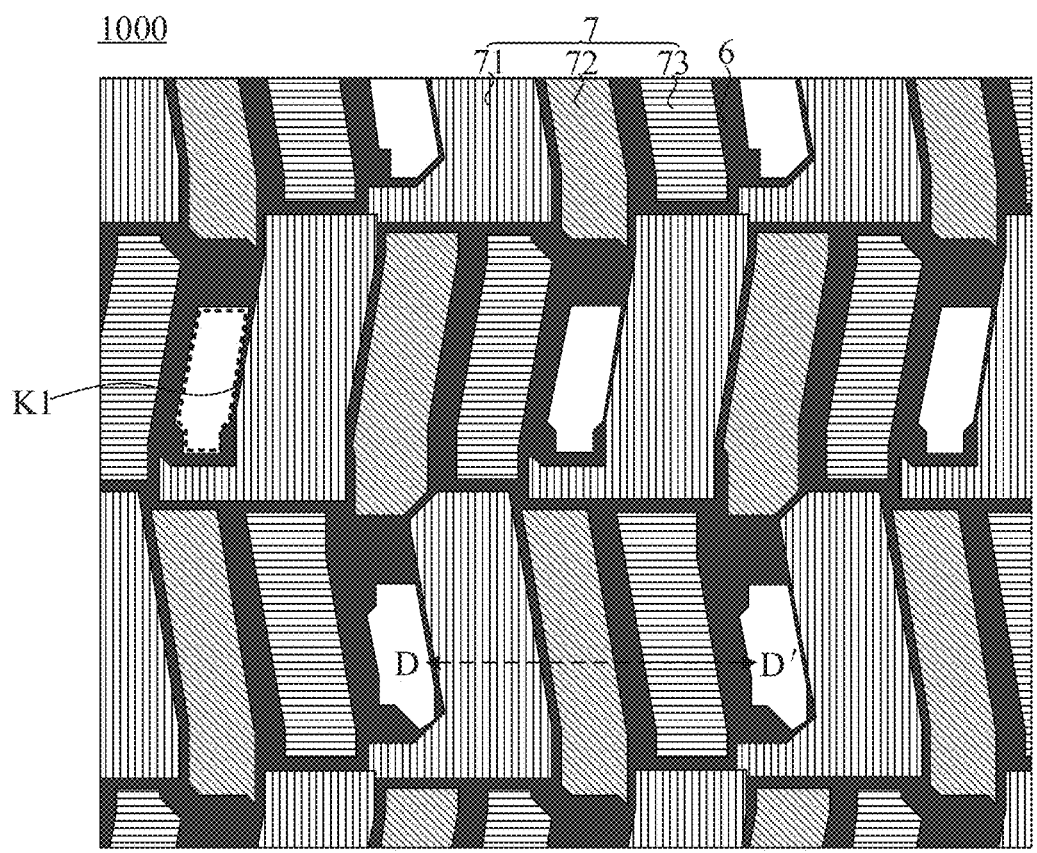
FIG. 13 is a top view of a display apparatus, in accordance with some embodiments of the present disclosure.

In some embodiments, as shown in FIGS. 12 to 14, the counter substrate 200 further includes a color filter layer 7 disposed in the plurality of second openings K2.

Here, in an example, the plurality of primary color sub-pixels S1 in the array substrate 100 include the plurality of red sub-pixels R2, the plurality of green sub-pixels G2 and the plurality of blue sub-pixels B2, accordingly, the color filter layer 7 includes red filter portions 71 respectively corresponding to the plurality of red sub-pixels R2, green filter portions 72 respectively corresponding to the plurality of green sub-pixels G2, and blue filter portions 73 respectively corresponding to the plurality of blue sub-pixels B2.

It will be noted that a surface of the color filter layer 7 away from the second substrate 5 and a surface of the black matrix 6 away from the second substrate 5 may be flush with each other. Alternatively, compared with the second substrate 5, the surface of the color filter layer 7 away from the second substrate 5 is higher or lower than the surface of the black matrix 6 away from the second substrate 5.

In some embodiments, as shown in FIG. 14, the counter substrate 200 further includes a planarization layer 8 disposed on a side of the color filter layer 7 away from the second substrate 5. A portion of the planarization layer is recessed in the plurality of first openings K1 of the black matrix 6.

There is no need to provide the color filter layer 7 in the plurality of first openings K1 corresponding to the plurality of white sub-pixels W2, therefore, after the planarization layer 8 is formed, the portion of the planarization layer 8 may naturally fall into the plurality of first openings K1, so as to fill spaces in the plurality of first openings K1. In this way, a thickness of a portion of the liquid crystal layer 300 (i.e., a dimension in a direction perpendicular to the second substrate 5) corresponding to the plurality of second openings K2 and a thickness of a portion (i.e., a dimension in the direction perpendicular to the second substrate 5) corresponding to the plurality of first openings K1 are equal or substantially equal, which is beneficial to avoid affecting the light output effect.

In some embodiments, the display apparatus 1000 further includes a plurality of separation spacers disposed between the array substrate 100 and the counter substrate 200.

In some examples, the plurality of separation spacers are configured to support the array substrate 100 and the counter substrate 200, so that distances between of the array substrate 100 and the counter substrate 200 at different positions are consistent or substantially consistent, so as to avoid affecting the display effect of the display apparatus 1000.

In some examples, in a case where in the column direction Y, the part of the light-shielding patterns 2 of the primary color sub-pixel S1 adjacent to the white sub-pixel W2 are disposed in the white sub-pixel region W1 where the white sub-pixel W2 is located, an area of a portion of the white sub-pixel region W1 shielded by the black matrix 6 is increased. Based on this, the separation spacers may be disposed in positions corresponding to the white sub-pixel regions W1, so that the separation spacers may be well provided while avoiding an additional increase in an area of the portion blocked by the black matrix 6, and in turn, it is avoided to reduce the aperture ratio of the display apparatus 1000.

In some examples, as shown in FIG. 13, in the row direction X, a shape of a color filter portion adjacent to a first opening K1 may be set, so that the first opening K1 is half-surrounded by the color filter portion.

For example, as shown in FIG. 13, in an example, an orthogonal projection of a red color filter portion 71 on the array substrate 100 is mirrored L-shaped. This may facilitate placing a separation spacer at a position of the mirrored L-shaped red color filter 71.

In some embodiments, in a case where the common electrodes 3 in the array substrate 100 also serve as the touch electrodes, and the common electrode lines VL also serve as the touch signal lines, the display apparatus 1000 further includes a touch and display driver integration (TDDI) chip disposed in a bezel area of the array substrate 100.

In some examples, the TDDI chip is configured to transmit the common voltage signals to the common electrodes 3 of the array substrate 100 through the common electrode lines VL in the display period of the display apparatus 1000, so that the common electrodes 3 may cooperate with the pixel electrodes 4 to make the display apparatus 1000 display images. The TDDI chip is further configured to transmit the touch control signals to the common electrodes 3 through the common electrode lines VL in the touch period of the display apparatus 1000, so as to realize the touch function by using the common electrodes 3.

By providing the TDDI chip, different signals may be transmitted to the common electrodes 3 in different periods, so that the display apparatus 1000 may realize different functions. That is, the touch function and the display function are integrated together, which is beneficial to simplify the structure of the display apparatus 1000 and simplify the manufacturing process of the display apparatus 1000.

In some embodiments, the display apparatus 1000 may be any apparatus that displays an image whether in motion (e.g., a video) or stationary (e.g., a still image), and whether textual or graphical. More specifically, it is contemplated that the described embodiments may be implemented in or associated with a variety of electronic devices. The variety of electronic devices may include (but not limit to), for example, mobile telephones, wireless devices, personal digital assistants (PDA), hand-held or portable computers, global positioning system (GPS) receivers/navigators, cameras, moving picture experts group (MP4) video players, video cameras, game consoles, watches, clocks, calculators, TV monitors, computer monitors, car displays (e.g., odometer displays), navigators, cockpit controllers and/or displays, camera view displays (e.g., rear view camera display in a vehicle), electronic photos, electronic billboards or signage, projectors, building structures, packaging and aesthetic structures (e.g., a display for an image of a piece of jewelry).

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the scope of the present disclosure shall be subject to the protection scope of the claims.

What is claimed is:

1. An array substrate having a plurality of sub-pixel regions arranged in an array, the plurality of sub-pixel regions including a plurality of white sub-pixel regions and a plurality of primary color sub-pixel regions, the array substrate comprising:
   a first substrate; and
   a plurality of sub-pixels disposed on a side of the first substrate, the plurality of sub-pixels including a plurality of white sub-pixels and a plurality of primary color sub-pixels;
   in a column direction, a side of each white sub-pixel being adjacent to at least one primary color sub-pixel of the plurality of primary color sub-pixels;
   wherein of the plurality of sub-pixels, each sub-pixel has a plurality of light-shielding patterns;
   in the column direction, in a plurality of light-shielding patterns of a primary color sub-pixel of the at least one primary color sub-pixel adjacent to the white sub-pixel, a part of the light-shielding patterns are disposed in a white sub-pixel region where the white sub-pixel is located, and another part of the light-shielding patterns are disposed in a primary color sub-pixel region corresponding to the primary color sub-pixel; and
   the plurality of primary color sub-pixels include a plurality of red sub-pixels, a plurality of green sub-pixels, and a plurality of blue sub-pixels; in the column direction, the white sub-pixel is adjacent to a green sub-pixel; and
   in a row direction, a red sub-pixel and a blue sub-pixel are located on two opposite sides of the green sub-pixel, and the row direction intersects the column direction;
   the array substrate further includes:
      a plurality of data lines disposed on the side of the first substrate;
      a plurality of gate lines disposed on the side of the first substrate; and
      a plurality of thin film transistors disposed on the side of the first substrate, the plurality of thin film transistors being used for driving the plurality of sub-pixels, and each thin film transistor including an active layer, a gate, a source and a drain;
      wherein opening directions of active layers of thin film transistors in the plurality of green sub-pixels are opposite to opening directions of active layers of thin film transistors in the plurality of red sub-pixels, opening directions of thin film transistors in the plurality of blue sub-pixels, and opening directions of thin film transistors in the plurality of white sub-pixels;
      orthographic projections of drains of the thin film transistors in the plurality of red sub-pixels, drains of the thin film transistors in the plurality of blue sub-pixels and drains of the thin film transistors in the plurality of white sub-pixels all overlap on a plane perpendicular to the row direction; and
      on the plane perpendicular to the row direction, orthographic projections of drains of the thin film transistors in the plurality of green sub-pixels do not overlap with the orthographic projections of the drains of the thin film transistors in the plurality of red sub-pixels, the drains of the thin film transistors in the plurality of blue sub-pixels and the drains of the thin film transistors in the plurality of white sub-pixels.

2. The array substrate according to claim 1,
   wherein the plurality of light-shielding patterns of the sub-pixel include:
      a portion, passing through the sub-pixel, of a data line of the plurality of data lines substantially extending in the column direction;
      a portion, passing through the sub-pixel, of a gate line of the plurality of gate lines substantially extending in the row direction; and
      the thin film transistor electrically connected to the data line and the gate line;
   wherein in the column direction, in the plurality of light-shielding patterns of the primary color sub-pixel adjacent to the white sub-pixel, the part of the light-shielding patterns disposed in the white sub-pixel region where the white sub-pixel is located include:
      a portion, passing through the primary color sub-pixel, of a gate line of the plurality of gate lines, and/or a thin film transistor.

3. The array substrate according to claim 1, wherein a ratio of areas of openings of the red sub-pixels, the green sub-pixels, the blue sub-pixels and the white sub-pixels is in a range of (0.8 to 1.2):(0.8 to 1.2):(0.8 to 1.2):(0.4 to 0.8).

4. The array substrate according to claim 3, wherein the ratio of the areas of the openings of the red sub-pixels, the green sub-pixels, the blue sub-pixels and the white sub-pixels is $1:1:1:\frac{1}{2}$, $1:1:1:\frac{27}{50}$, $1:1:1:\frac{11}{20}$ or $1:1:1:\frac{2}{3}$.

5. The array substrate according to claim 1, wherein in the row direction, a dimension of an opening of the red sub-pixel is substantially equal to a dimension of an opening of the blue sub-pixel, the dimension of the opening of the red sub-pixel is greater than a dimension of an opening of the green sub-pixel, and the dimension of the opening of the green sub-pixel is greater than a dimension of an opening of the white sub-pixel; and
   in the column direction, a dimension of the opening of the green sub-pixel is greater than a dimension of the opening of the red sub-pixel, the dimension of the opening of the red sub-pixel is substantially equal to a dimension of the opening of the blue sub-pixel, and the dimension of the opening of the red sub-pixel is greater than a dimension of the opening of the white sub-pixel.

6. The array substrate according to claim 5, wherein in the row direction, a ratio of the dimension of the opening of the red sub-pixel, the dimension of the opening of the green sub-pixel, the dimension of the opening of the blue sub-pixel and the dimension of the opening of the white sub-pixel is in a range of (1.4 to 1.5):(1.2 to 1.4):(1.4 to 1.5):1; and
   in the column direction, a ratio of the dimension of the opening of the red sub-pixel, the dimension of the opening of the green sub-pixel, the dimension of the opening of the blue sub-pixel and the opening dimension of the white sub-pixel is in a range of (1.2 to 1.3):(1.3 to 1.8):(1.2 to 1.3):1.

7. The array substrate according to claim 6, wherein in the row direction, the ratio of the dimension of the opening of the red sub-pixel, the dimension of the opening of the green sub-pixel, the dimension of the opening of the blue sub-pixel and the dimension of the opening of the white sub-pixel is 1.4:1.2:1.4:1, 1.42:1.23:1.45:1, or 1.5:1.4:1.5:1.

8. The array substrate according to claim 6, wherein in the column direction, the ratio of the dimension of the opening of the red sub-pixel, the dimension of the opening of the green sub-pixel, the dimension of the opening of the blue sub-pixel and the opening dimension of the white sub-pixel is 1.2:1.3:1.2:1, 1.25:1.4:1.26:1, or 1.3:1.8:1.3:1.

9. The array substrate according to claim 1, further comprising a plurality of common electrode lines extending in the column direction;
   wherein the sub-pixel further includes a common electrode disposed on a side of the plurality of light-shielding patterns away from the first substrate;
   the common electrode is electrically connected to at least one common electrode line of the plurality of common electrode lines.

10. The array substrate according to claim 9,
   wherein the plurality of light-shielding patterns include a portion, passing through the sub-pixel, of a data line of the plurality of data lines; and
      the plurality of common electrode lines and the data line are disposed in a same layer.

11. The array substrate according to claim 9,
   wherein in a direction parallel to a plane where the first substrate is located and perpendicular to the column direction, a ratio of a dimension of a common electrode line of the plurality of common electrode lines and a dimension of a data line of the plurality of data lines is in a range of 1:2 to 1:1, inclusive.

12. The array substrate according to claim 9, wherein the sub-pixel further includes a pixel electrode disposed on a side of the common electrode away from the first substrate;
   the pixel electrode has at least one slit, and an extending direction of the at least one slit is parallel to or at an acute angle to the column direction.

13. The array substrate according to claim 12, wherein the pixel electrode includes strip-shaped sub-electrodes located on two sides of the slit; and
   in the row direction, a range of a ratio between a dimension of a slit and a dimension of a stripe-shaped sub-electrode of a pixel electrode in the white sub-pixel is substantially same as a range of a ratio between a dimension of a slit and a dimension of a stripe-shaped sub-electrode of a pixel electrode in the green sub-pixel.

14. The array substrate according to claim 13, wherein in the row direction, the ratio between the dimension of the slit and the dimension of the stripe-shaped sub-electrode of the pixel electrode in the white sub-pixel is in a range of (2.4 to 2.8):(2.0 to 2.7).

15. The array substrate according to claim 13, wherein in the row direction, a range of a ratio between a dimension of a slit and a dimension of a stripe-shaped sub-electrode of a pixel electrode in the red sub-pixel is substantially same as a range of a ratio between a dimension of a slit and a dimension of a stripe-shaped sub-electrode of a pixel electrode in the blue sub-pixel.

16. The array substrate according to claim 15, wherein in the row direction, the ratio between the dimension of the slit and the dimension of the stripe-shaped sub-electrode of the pixel electrode in the red sub-pixel is in a range of (2.2 to 2.8):(2.0 to 2.5).

17. A display apparatus, comprising:
   the array substrate according to claim 1;
   a counter substrate disposed opposite to the array substrate; and
   a liquid crystal layer disposed between the array substrate and the counter substrate.

18. The display apparatus according to claim 17, wherein the counter substrate includes:
   a second substrate;
   a black matrix disposed on a side of the second substrate proximate to the array substrate, the black matrix having a plurality of openings, and the plurality of openings including a plurality of first openings respectively opposite to the plurality of white sub-pixels in the array substrate and a plurality of second openings respectively opposite to the plurality of primary color sub-pixels in the array substrate;
   a color filter layer, the color filter layer including a plurality of color filter portions each disposed in a respective one of the plurality of second openings; and
   a planarization layer disposed on a side of the color filter layer away from the second substrate, a portion of the planarization layer being located in the plurality of first openings.

* * * * *